US007526750B2

(12) United States Patent
Andrews et al.

(10) Patent No.: US 7,526,750 B2
(45) Date of Patent: Apr. 28, 2009

(54) OBJECT-BASED SYSTEMATIC STATE SPACE EXPLORATION OF SOFTWARE

(75) Inventors: Anthony D. Andrews, Sammamish, WA (US); Shaz Qadeer, Seattle, WA (US); Niels Jakob Rehof, Redmond, WA (US); Sriram K. Rajamani, Bellevue, WA (US); Yichen Xie, Standford, CA (US)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 10/778,969

(22) Filed: Feb. 13, 2004

(65) Prior Publication Data

US 2005/0086648 A1 Apr. 21, 2005

Related U.S. Application Data

(60) Provisional application No. 60/511,926, filed on Oct. 15, 2003, provisional application No. 60/534,884, filed on Jan. 5, 2004.

(51) Int. Cl.
*G06F 9/44* (2006.01)
*G06F 7/00* (2006.01)
(52) U.S. Cl. .................................. 717/104; 707/103 R
(58) Field of Classification Search ................. 717/127, 717/135, 104; 709/103 R
See application file for complete search history.

(56) References Cited

U.S. PATENT DOCUMENTS

| | | | |
|---|---|---|---|
| 4,525,780 A * | 6/1985 | Bratt et al. .................. 711/163 |
| 4,545,013 A * | 10/1985 | Lyon et al. ................... 714/712 |
| 5,586,323 A | 12/1996 | Koizumi et al. | |
| 5,590,276 A | 12/1996 | Andrews | |
| 5,615,137 A * | 3/1997 | Holzmann et al. ............. 703/17 |
| 5,754,860 A | 5/1998 | McKeeman et al. | |
| 5,990,906 A * | 11/1999 | Hudson et al. ............... 345/666 |
| 6,006,239 A * | 12/1999 | Bhansali et al. ............. 707/201 |
| 6,295,515 B1 * | 9/2001 | Kurshan et al. ............... 703/13 |
| 6,314,555 B1 | 11/2001 | Ndumu et al. | |
| 6,385,724 B1 | 5/2002 | Beckman et al. | |
| 6,385,765 B1 | 5/2002 | Cleaveland et al. | |
| 6,438,745 B1 | 8/2002 | Kanamaru et al. | |
| 6,487,665 B1 | 11/2002 | Andrews et al. | |
| 6,574,736 B1 | 6/2003 | Andrews | |
| 6,742,006 B2 | 5/2004 | Raduchel et al. | |
| 6,757,756 B1 * | 6/2004 | Lanteigne et al. ............. 710/52 |
| 6,889,379 B1 * | 5/2005 | Lindhorst et al. ........... 719/316 |
| 6,986,117 B1 * | 1/2006 | Teig et al. ....................... 716/7 |
| 6,988,270 B2 * | 1/2006 | Banavar et al. ............. 719/310 |
| 7,055,065 B2 * | 5/2006 | Farchi et al. .................. 714/38 |

(Continued)

OTHER PUBLICATIONS

Bharadwaj, Ramesh; Heitmeyer, Constance; "Verifying SCR Requirements Specifications Using State Exploration", Jan. 1997, ACM retrieved Apr. 10, 2007.*

(Continued)

*Primary Examiner*—Wei Y Zhen
*Assistant Examiner*—Chih-Ching Chow
(74) *Attorney, Agent, or Firm*—Klarquist Sparkman, LLP

(57) ABSTRACT

The state space of modeled software can be explored using an object-based systematic state explorer. The object-based model can perform well even in light of the complexities of concurrent software. During state space exploration, differences between states can be stored instead of storing a complete copy of the state.

33 Claims, 24 Drawing Sheets

U.S. PATENT DOCUMENTS

| | | | | |
|---|---|---|---|---|
| 7,206,805 | B1* | 4/2007 | McLaughlin, Jr. | 709/203 |
| 7,206,910 | B2* | 4/2007 | Chang et al. | 711/162 |
| 2002/0144233 | A1* | 10/2002 | Chong et al. | 717/105 |
| 2002/0166032 | A1 | 11/2002 | Qadeer | |
| 2002/0178401 | A1 | 11/2002 | Ball et al. | |
| 2003/0167333 | A1* | 9/2003 | Kumar et al. | 709/227 |
| 2003/0204570 | A1 | 10/2003 | Rehof et al. | |
| 2003/0204641 | A1 | 10/2003 | Rehof et al. | |
| 2005/0254686 | A1* | 11/2005 | Koizumi | 382/103 |

OTHER PUBLICATIONS

Hunt, James J.; Vo, Kiem-Phong; Tichy, Walter F.; "Delta Algorithms: An Empirical Analysis", 1998 ACM retrieved Apr. 10, 2007.*

Ugarte, I.; Sanchez; P.; "Functional Vector Generation for Assertion-Based Verification at Behavioral Level using Interval Analysis", 2003 IEEE, retrieved Apr. 10, 2007.*

Yang, Jin; Mok, Aloysius K.; "Symbolic Model Checking for Event-Driven Real-Time Systems", 1997 ACM, retrieved Apr. 10, 2007.*

Beser et al., "Reusable Ada Avionics Software Packages Library System", Aerospace and Electronics Conference, 1992. NAECON 1992., Proceedings of the IEEE 1992 National, May 18-22, 1992, pp. 598-602, http://ieeexplore.ieee.org/iel2/655/5765/00220561.pdf?tp=&arnumber=220561&isnumber=5765.*

U.S. Appl. No. 60/450,982, filed Feb. 28, 2003, Rehof et al.

U.S. Appl. No. 10/659,221, filed Dec. 10, 2003, Rehof et al.

"Failures-Divergence Refinement," *FDR2 User Manual—Fifth Edition*, FDR Version 2.69, Formal Systems (Europe) Ltd, http://www.fsel.com/, 84 pages, May 3, 2000.

"Failures-Divergence Refinement," *FDR2 User Manual—Sixth Edition*, FDR Version 2.80, Formal Systems (Europe) Ltd, http://www.fsel.com/, 84 pages, May 2, 2003.

"Security Protocols," Oxford University Computing Laboratory, http://web.comlab.ox.ac.uk/oucl/work/philippa.broadfoot/securityProtocols.html, 3 pages, website visited on Nov. 18, 2003.

"VeriSoft Home-Page" © 1996-2004 Bell Laboratories, Lucent Technologies, http://cm.bell-labs.com/who/god/verisoft/, 2 pages, website visited on Jan. 12, 2004.

Ball et al., "The SLAM Project: Debugging System Software via Static Analysis," *POPL '02*, Portland, Oregon, USA, pp. 1-3, Jan. 2002.

Bultan et al., "Model-Checking Concurrent Systems with Unbounded Integer Variables: Symbolic Representations, Approximations, and Experimental Results," ACM Transactions on Programming Languages and Systems, vol. 21, No. 4, pp. 747-789, Jul. 1999.

Bush et al., "A Static Analyzer for Finding Dynamic Programming Errors," *Software—Practice and Experience*, vol. 30, pp. 775-802, 2000.

Chaki, et al., "Types as Models: Model Checking Message-Passing Programs," In Proceedings, 29th ACM Symposium on Principles of Programming Languages, pp. 45-57, ACM, 2002.

Cleaveland, et al., "The Concurrency Workbench: A Semantics-Based Tool for the Verification of Concurrent Systems," ACM Transactions on Programming Languages and Systems, 15(1):36-72, Jan. 1993.

Condit et al., "Region-Based Model Abstraction," Open Source Quality Meeting at U.C. Berkley, 24 pages, Lecture given on Aug. 8, 2003.

Corbett et al., "Bandera: Extracting Finite-State Models from Java Source Code," In Proceedings of the 22nd International Conference on Software Engineering Ireland, ACM Press, pp. 439-448, 2000.

Das et al., "ESP: Path-Sensitive Program Verification in Polynomial Time," *PLDI'02*, Berlin, Germany, pp. 57-68, Jun. 2002.

Flanagan et al., "Thread-Modular Verification for Shared-Memory Programs," HP Labs Technical Reports, SRC Technical Note 2001-003, Compaq Computer Corporation, 20 pages, Nov. 19, 2001.

Flanagan et al., "Thread-Modular Verification for Shared-Memory Programs," Lecture Notes in Computer Science, Proceedings of the 11th European Symposium on Programming Languages and Systems, Springer-Verlag, London, UK, 15 pages, 2002.

Flanagan et al., "Atomizer: A Dynamic Atomicity Checker for Multithreaded Programs," *POPL'04*, Venice, Italy, pp. 256-267, Jan. 14-16, 2004.

Freund et al., "Checking Concise Specifications for Multithreaded Software," Williams College Technical Note Jan. 2002, 16 pages, Dec. 2002.

Freund et al., "Checking Concise Specifications for Multithreaded Software," FTfJP'2003, Proceedings of the Fifth ECOOP Workshop on Formal Techniques for Java-like Programs, Darmstadt, Germany, 10 pages, Jul. 21, 2003.

Freund et al., "Checking Concise Specifications for Multithreaded Software," Williams College Technical Note Jan. 2002 (revised Dec. 2003), 18 pages, Dec. 2003.

Godefroid, "Model Checking for Programming Languages using VeriSoft," Proceedings of the 24th ACM Symposium on Principles of Programming Languages, pp. 174-186, Paris, Jan. 1997.

Godefroid, "VeriSoft: A Tool for the Automatic Analysis of Concurrent Reactive Software" Proceedings of the 9th Conference on Computer Aided Verification, Lecture Notes in Computer Science, vol. 1254, pp. 476-479, Springer-Verlag, Haifa, Jun. 1997.

Godefroid, "'Model-Checking' Software with VeriSoft" © 1996-2004 Bell Laboratories, Lucent Technologies, Talk given at Microsoft Research, Apr. 2000, http://cm.bell-labs.com/who/god/verisoft/papers.html, 22 pages, website visited Jan. 12, 2004.

Hoare, *Communicating Sequential Processes*, Prentice-Hall International Series in Computer Science, Prentice Hall, pp. i-256, 1985.

Holzmann, "The Model Checker SPIN," IEEE Transactions on Software Engineering, vol. 23, No. 5, 17 pages, May 1997.

Lamport, "A New Approach to Proving the Correctness of Multiprocess Programs," ACM Transactions on Programming Languages and System, vol. 1, No. 1, pp. 84-97, Jul. 1979.

Larsen, et al., "Bisimulation Through Probabilistic Testing (Preliminary Report)," Proceedings of the 16th ACM SIGPLAN-AIGACT Symposium on Principles of Programming Languages, pp. 344-352, 1989.

Larsen et al., "UPPAAL in a Nutshell," International Journal on Software Tools for Technology Transfer, 1(1-2), pp. 134-152. Springer-Verlag. 1998.

Lipton, "Reduction: A Method of Proving Properties of Parallel Programs," Communications of the ACM, vol. 18, No. 12, pp. 717-721, Dec. 1975.

Milner, *Communication and Concurrency*, Prentice-Hall International Series in Computer Science, Prentice Hall, pp. i-260, 1989.

Milner, *Communicating and Mobile Systems: the π-Calculus*, Cambridge University Press, pp. i-161, 1999.

Per Cederqvist et al., "Version Management with CVS (for CVS 1.11.10)," 184 pages, visited http://www.cvshome.org on Feb. 5, 2004.

Rajamani, et al., "Abstracts of the Software Model Checking Workshop Talks," http://www.sei.cmu.edu/pacc/smcw/abstracts.html, 3 pages, website visited on Feb. 5, 2004.

Reps et al., "Precise Interprocedural Dataflow Analysis via Graph Reachability," Proceedings of the 22nd ACM SIGPLAN-SIGACT Symposium on Principles of Programming Languages, pp. 49-61, Jan. 1995.

Roscoe, *The Theory and Practice of Concurrency*, Prentice Hall Series in Computer Science, Prentice Hall, pp. i-566, 1998.

Rus et al., "Algebraic Implementation of Model Checking," Proceedings of the 3rd AMAST Workshop on Real-Time Systems held in Salt Lake City, Utah, 20 pages, 1996.

Sharir et al., "Two Approaches to Interprocedural Data Flow Analysis," *Program Flow Analysis: Theory and Applications*, Prentice-Hall, Inc., pp. 189-233, 1981.

Steffen, et al., "Composition, Decomposition and Model Checking of Pushdown Processes," Nordic Journal of Computing, vol. 2, pp. 89-125, 1995.

Visser et al., "Model Checking Programs," Proceedings of the 15th International Conference on Automated Software Engineering (ASE), Grenoble, France, 9 pages, Sep. 2000.

Whaley et al., "Compositional Pointer and Escape Analysis for Java Programs," Proceedings of the 14th ACM SIGPLAN, Conference on Object-Oriented Programming, Systems, Languages, and Applications, Denver, Colorado, ACM Press, New York, NY, pp. 187-206, 1999.

Alur, et al., "MOCHA: Modularity in Model Checking," Proceedings of the Tenth International Conference on Computer Aided Verification (CAV 98), Lecture Notes in Computer Science 1427, pp. 521-525, Springer-Verlag, 1998.

Andrews, et al., "Business Process Execution Language for Web Services, Version 1.1," IBM Corporation and Microsoft Corporation, 136 pages, http://www-106.ibm.com/developerworks/library/ws-bpel/, May 2003.

Andrews et al., "Zing: Exploiting Program Structure for Model Checking Concurrent Software," in CONCUR 2004, http://www.research.microsoft.com/zing/, 15 pages, 2004.

Andrews et al., "Zing: A Model Checker for Concurrent Software," *MSR-TR-2004-10*, http://www.research.microsoft.com, 7 pages, 2004.

Baader et al., *Term Rewriting and All That*, Cambridge University Press, pp. i-301, Aug. 1999.

Ball, T. et al., "Bebop: A Symbolic Model Checker for Boolean Programs," *SPIN 00: Spin Workshop*, LNCS 1885, 20 pages, 2000.

Broder A., "Some Applications of Rabin's Fingerprinting Method," *Sequences II: Methods in Communications, Security and Computer Science*, pp. 1-10, 1993.

Brookes, S.D. et al., "A Theory of Communicating Sequential Processes," *Journal of the ACM*, 31(3):560-599, 1984.

Chinnici, et al., "Web Services Description Language (WSDL) Version 1.2 Part 1: Core Language," W3C Working Draft, http://www.w3.org/TR/2003/WD-wsdl12-20030611/, 103 pages, Jun. 2003.

Chinnici, et al., "Web Services Description Language (WSDL) Version 2.0 Part 1: Core Language," W3C Working Draft, 24 pages, http://www.w3.org/TR/wsdl20/, Nov. 2003.

Curbera, et al., "Business Process Execution Language for Web Services, Version 1.0," IBM Corporation and Microsoft Corporation, 84 pages, ftp://www6.software.ibm.com/software/developer/library/ws-bpell.pdf, Jul. 31, 2002.

Dwyer, Matthew et al., "Tool-Supported Program Abstraction for Finite-state Verification," pp. 1-10, 2001.

Flanagan et al., "Transactions for Software Model Checking," *Electronic Notes in Theoretical Computer Science*, 89(3), pp. 1-22, 2003.

Fournet, C. et al., "Stuck-Free Conformance Theory for CCS," *MSR Technical Report-2004-69*, 20 pages, 2004.

Henzinger et al., "Decomposing refinement proofs using assume-guarantee reasoning," Proceedings of the 2000 IEEE/ACM International Conference on Computer-aided Design, pp. 245-252, Nov. 2000.

Holzmann, Gerard J., "Logic Verification of ANSI-C code with SPIN," *SPIN 00: SPIN Workshop*, LNCS 1885, 15 pages, 2000.

Hull, et al., "E-Services: A Look Behind the Curtain," International Conference on Management of Data and Symposium on Principles of Database Systems, Proceedings of the 22nd ACM SIGMOD-SIGACT-SIGART Symposium on Principles of Database Systems, pp. 1-14, Jun. 2003.

Igarashi, et al., "A Generic Type System for the Pi-Calculus," http://www.sato.kuis.kyoto-u.ac.jp/~igarashi/papers/pdf/genericpi-tcs.pdf, pp. 1-39, Jun. 10, 2003.

Iosif, R. et al., "dSPIN: A Dynamic Extension of SPIN," *SPIN 99: SPIN Workshop*, LNCS 1680, 16 pages, 1999.

McMillan, "A Compositional Rule for Hardware Design Refinement," In O. Grumberg, editor, CAV 97: Computer Aided Verification, Lecture Notes in Computer Science 1254, 42 pages, Springer-Verlag, 1997.

Qadeer, Shaz et al., "Summarizing Procedures in Concurrent Programs," *POPL '04*, Jan. 14-16, 11 pages, 2004, Venice, Italy.

Rajamani, et al., "Conformance Checking for Models of Asynchronous Message Passing Software," Computer Aided Verification: 14th International Conference, *CAV 2002*, Springer-Verlag, pp. 166-179, Jul. 2002.

Rajamani et al., "Contracts and Futures for Asynchronous Programming (Abstract)," *Abstracts of the Software Model Checking Workshop Talks*, www.cs.cmu.edu/~svc/talks/SEI-Workshop/abstracts.html, 1 page, available as early as Mar. 19, 2003.

Ramalingam, G., "Context-Sensitive Synchronization Sensitive Analysis is Undecidable," *ACM Trans. On Programming Languages and Systems*, 22(2):416-430, Mar. 2000.

Robby et al., "Bogor: An Extensible and Highly-Modular Software Model Checking Framework," *FSE 03: Foundations of Software Engineering*, 10 pages, 2003.

Schneider, " Enforceable Security Policies," ACM Transactions on Information and System Security, vol. 3, No. 1, pp. 1-18, Feb. 2000.

Stoller, S.D., "Model-Checking Multi-Threaded Distributed Java Programs," *International Journal on Software Tools for Technology Transfer*, 4(1):1-25, Sep. 2000.

"Summarizing Procedures in Concurrent Programs," powerpoint presentation presented at Dagstuhl Seminar on Applied Deductive Verification, 37 pages, 2003.

"Summarizing Procedures in Concurrent Programs," powerpoint presentation presented at ACM Symp on Principles of Programming Languages, 24 pages, 2004.

Vardi et al., "An Automata-Theoretic Approach to Automatic Program Verification," in Proc. 1st Symp. on Logic in Computer Science, Cambridge, 18 pages, Jun. 1986.

Zing: "Exploiting Program Structure for Model Checking Concurrent Software," presented at *CONCUR*, 50 pages, 2004.

Zing: "A Systematic State Explorer for Concurrent Software," powerpoint presentation, 35 pages, at least as early as Oct. 30, 2005.

\* cited by examiner

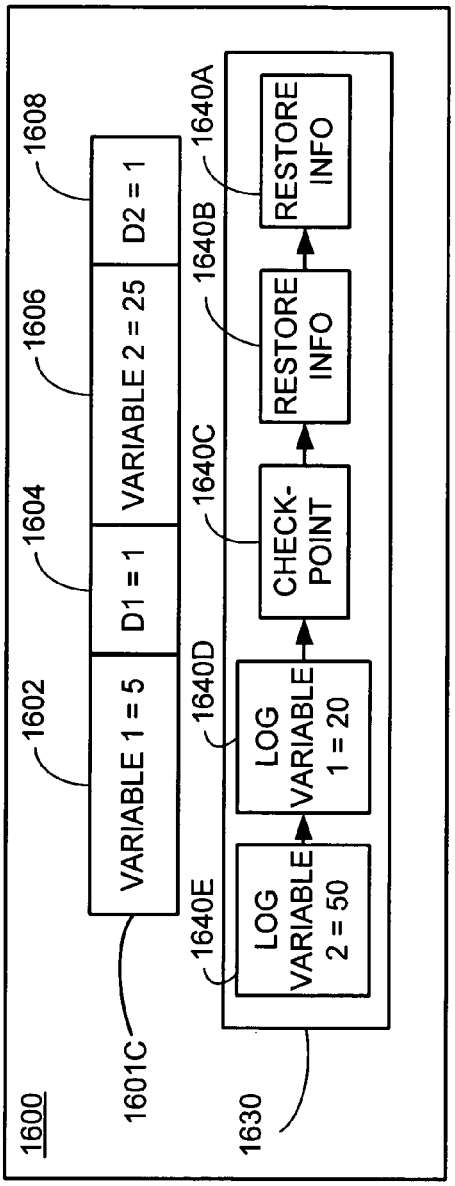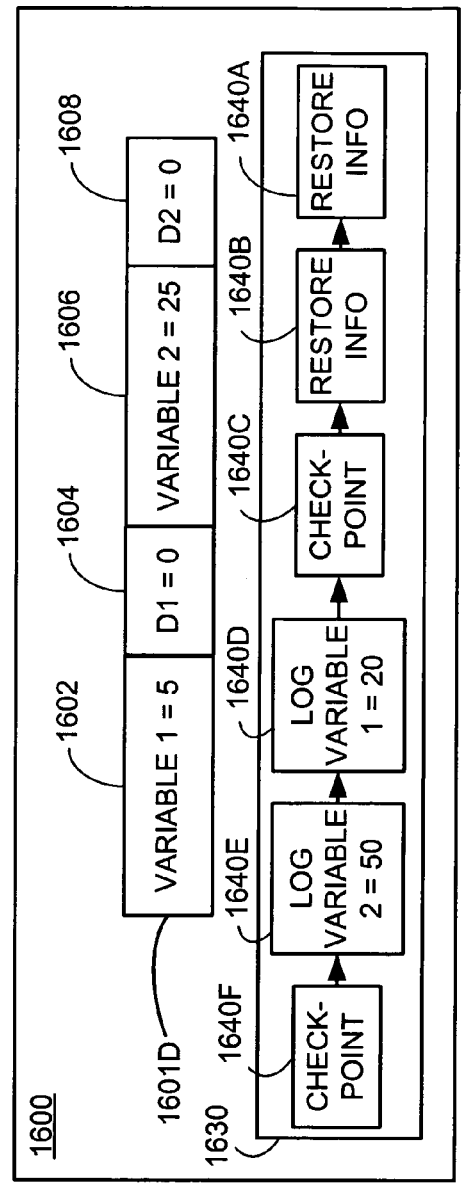

OBJECT-BASED SYSTEMATIC STATE SPACE EXPLORATION OF SOFTWARE

CROSS REFERENCE TO RELATED APPLICATIONS

This application claims the benefit of U.S. provisional patent application No. 60/511,926, entitled "ZING: A SYSTEMATIC STATE EXPLORER FOR CONCURRENT SOFTWARE," inventors Andrews et al., filed Oct. 15, 2003; and also claims the benefit of U.S. provisional patent application No. 60/534,884, entitled "A SYSTEMATIC STATE EXPLORER FOR CONCURRENT SOFTWARE," inventors Andrews et al., filed Jan. 5, 2004; both of which are hereby incorporated herein by reference.

TECHNICAL FIELD

The technical field relates to software modeling, such as modeling to perform state space exploration for modeled software.

BACKGROUND

The sheer complexity of the software development process makes it increasingly difficult for programmers to detect programming flaws. As a result, software testing has become an important part of software development. For example, when writing concurrent programs, a programmer must consider every possible interleaving of events among various processes. Despite decades of research and engineering experience, few programmers succeed in writing robust concurrent programs. Large teams can sometimes manage the problem organizationally: a core set of experienced people design a concurrency model while every other developer is required to follow it. Such an approach has been successful only to a limited extent. Concurrency-related bugs still surface in stress tests. Such bugs are very hard to reproduce, debug, and correct. Because more and more programmers are writing concurrent programs, problems associated with concurrency are predicted to grow.

Currently, testing systems do not systematically consider concurrencies between two or more asynchronous processes. Consequently, subtle communication disconnects in concurrent processes may remain undiscovered.

One technique for developing and testing software is systematic state space exploration. However, in practice, software of any significant magnitude has such large numbers of states that it has been infeasible for any systematic approach to cover all the reachable states. Also, traditional state space explorers analyze the behavior of a program one thread at a time. Thus, errors due to interactions between threads cannot be directly detected using these tools. For example, errors that occur only if an interrupt service routine interleaves with a dispatch routine in a particular way can lie undetected in the program after several months of stress testing. Thus, conventional state space exploration is of limited use. There thus remains a need for improved software modeling techniques.

SUMMARY

An object-based software model can be constructed. The object-based software model can support a wide variety of modeling functionality. For example, the model can support plural processes, plural threads, stacks, a heap, or any combination thereof. The model can expose an interface by which software modeling functions can be invoked. The interface can be used by a systematic state space explorer or another program to examine possible states of the software being tested.

Separately, whenever software is modeled, it may be desirable to represent a plurality of modeled states for the software. A base state and a difference between the base state and another state can be stored rather than storing both states. A reverse state delta can indicate the differences between a current state and a previous state, allowing the previous state to be easily recovered without having to keep a complete copy.

The foregoing and other features and advantages will become more apparent from the following detailed description of disclosed embodiments, which proceeds with reference to the accompanying drawings.

BRIEF DESCRIPTION OF THE FIGURES

FIGS. 16A-D are block diagrams showing exemplary data structures for implementing state deltas.

DETAILED DESCRIPTION

EXAMPLE 1

Exemplary System for Systematic State Space Exploration of Modeled Software

Figure 1:
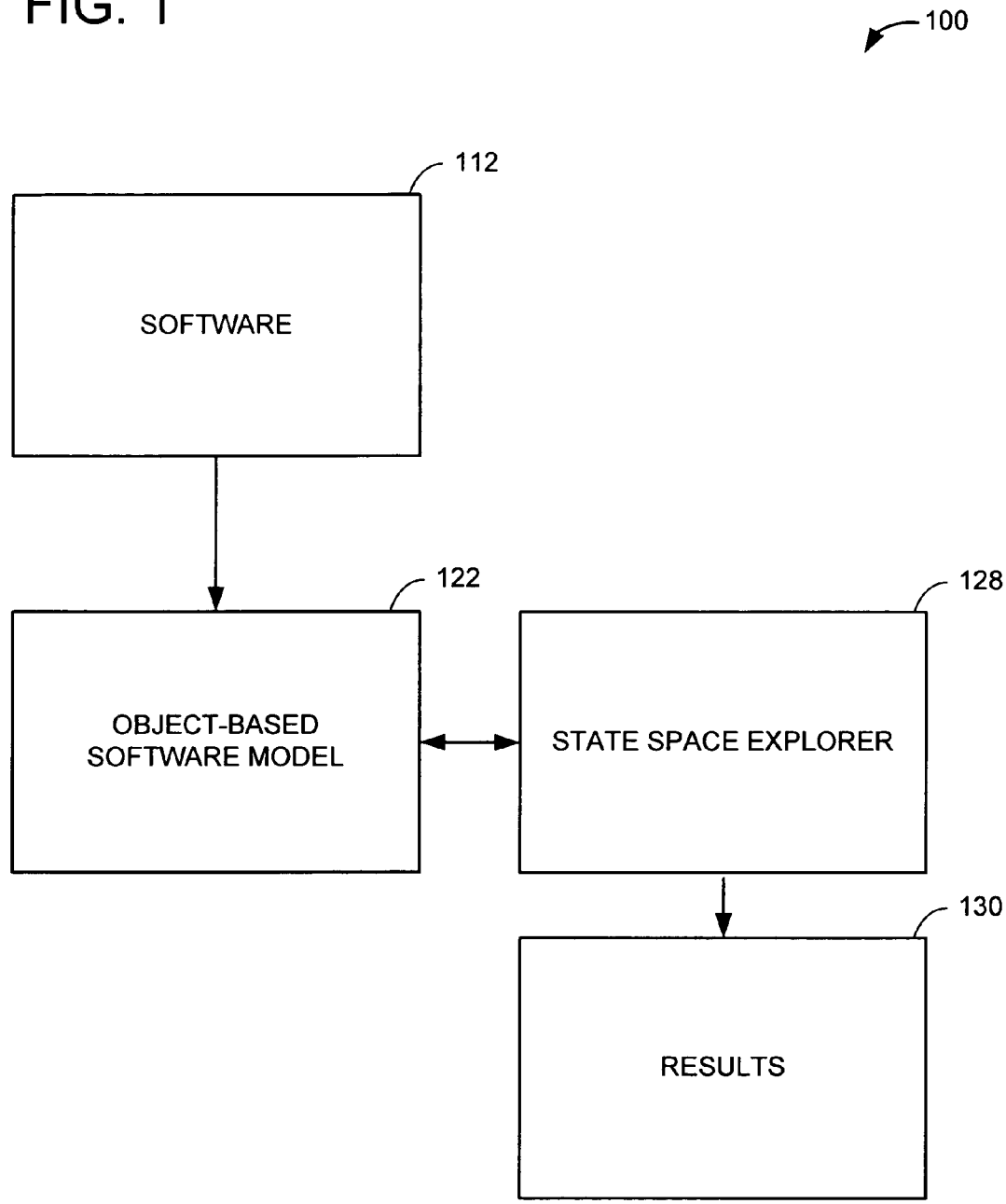
FIG. 1 is a block diagram showing an exemplary system for systematic state space exploration of modeled software.

FIG. 1 is a block diagram representing an exemplary system 100 for systematic state space exploration of modeled software. In the example, the system 100 accepts software to be tested 112 as input and generates from it an object-based software model 122 of the software to be tested 112. The object-based software model 122 can model the software 112 by representing the software 112 in a form appropriate for facilitating state space exploration.

The object-based software model 122 can model the logic of the software 112, but need not model the complete logic. For example, in some cases, logic can be abstracted away during model generation. The object-based model 122 can also represent a current state of the software model 122. For example, the software model can model memory during modeled execution of the modeled software.

A state space explorer 128 can analyze the object-based software model 122 to determine the behavior of the modeled software 112. For example, the state space explorer 128 can model execution of the software 112 through analysis of the object-based software model 122 to detect programming flaws.

The state space explorer 128 can generate results 130. For example, the state space explorer can indicate whether the software 112 contains programming errors and provide information about such errors.

EXAMPLE 2

Exemplary Advantages of a System for Systematic State Space Exploration of Modeled Software Various advantages can stem from the arrangement of FIG. 1. In the example, the object-based software model 122 is decoupled from the state space explorer 128. For example, the state space explorer 128 can communicate with the object-based software model 122 via one or more standard interfaces (e.g., having a set of method calls) on one or more objects in the model 122. In such an arrangement, the logic for exploring the state space of the software can be decoupled from the logic for modeling the software. Thus, for example, innovations in one need not impact the other.

Further, if a standard interface is exposed by the object-based software model 122, tools other than a state space explorer 128 can take advantage of the object-based software model 122. For example, a simulator, a debugger, a visualizer, an interactive state explorer, or the like can be used.

EXAMPLE 3

Exemplary Method for Testing Software

Figure 2:
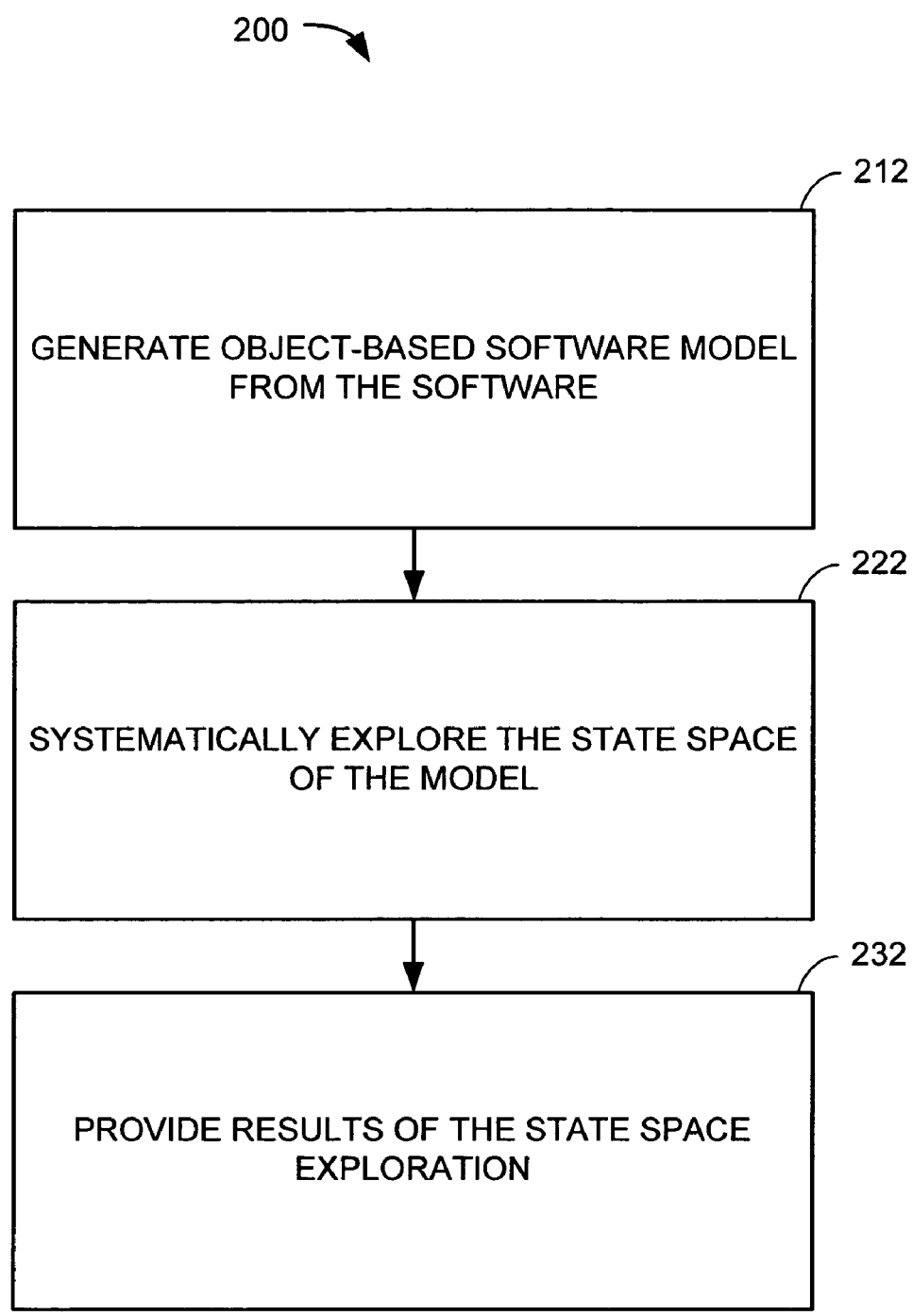
FIG. 2 is a flowchart showing an exemplary method for testing software, such as with the system shown in FIG. 1.

FIG. 2 is a flowchart showing an exemplary method 200 for testing software, such as with the system shown in FIG. 1. The methods of any of the examples described herein can be performed in software executing computer-executable instructions. Such instructions can be stored in one or more computer-readable media. In some cases, the actions shown need not be performed separately. For example, two or more actions can be combined into a single action.

At 212, an object-based software model (e.g., the model 122 of FIG. 1) of the software to be tested (e.g., the software 112 of FIG. 1) is generated from the software.

At 222, the state spaces of the model are systematically explored for programming flaws (e.g., by the state space explorer 128 of FIG. 1). For example, execution of the software can be modeled and the state spaces of the software explored to detect whether any specified invariants (e.g., asserts) fail for any execution path of the software.

At 232, results (e.g., results 130 of FIG. 1) of the state space exploration of the model are provided. These results may contain information regarding any programming errors in the software discovered during the state space exploration of the model.

EXAMPLE 4

Exemplary Software to be Tested

In any of the examples herein, the software to be tested (e.g., the software 112 of FIG. 1) can take the form of source code, from which an object-based model of the software can be generated automatically by the testing system. For example, the modeled software can take the form of source code of languages such as C, C++, the VISUAL BASIC programming language of Microsoft Corporation, the JAVA language of Sun Microsystems, Inc., and related or other languages.

If desired, the source language can be translated into an intermediate form (e.g., an intermediary source-like language), from which the object-based software model is generated (e.g., compiled). In this way, any number of source languages can be supported by first translating them into the intermediate form.

The system can support a wide variety of software to be tested. For example, the modeled software to be tested can include concurrent programs, such as multithreaded programs. Although concurrency is commonly used in web services and workflows, the techniques described herein can also be applied to any other (e.g., operating system) software.

EXAMPLE 5

Exemplary Concurrent Software

Exemplary concurrent software includes software that makes use of more than one thread during execution of the software. For example, multithreaded software can include a scenario where two threads access one or more shared variables. This software can include synchronization mechanisms (e.g., locks, mutexes, semaphores, and the like) to avoid undesirable phenomena such as race conditions for shared variables or other conditions associated with execution of concurrent programs.

EXAMPLE 6

Figure 3:
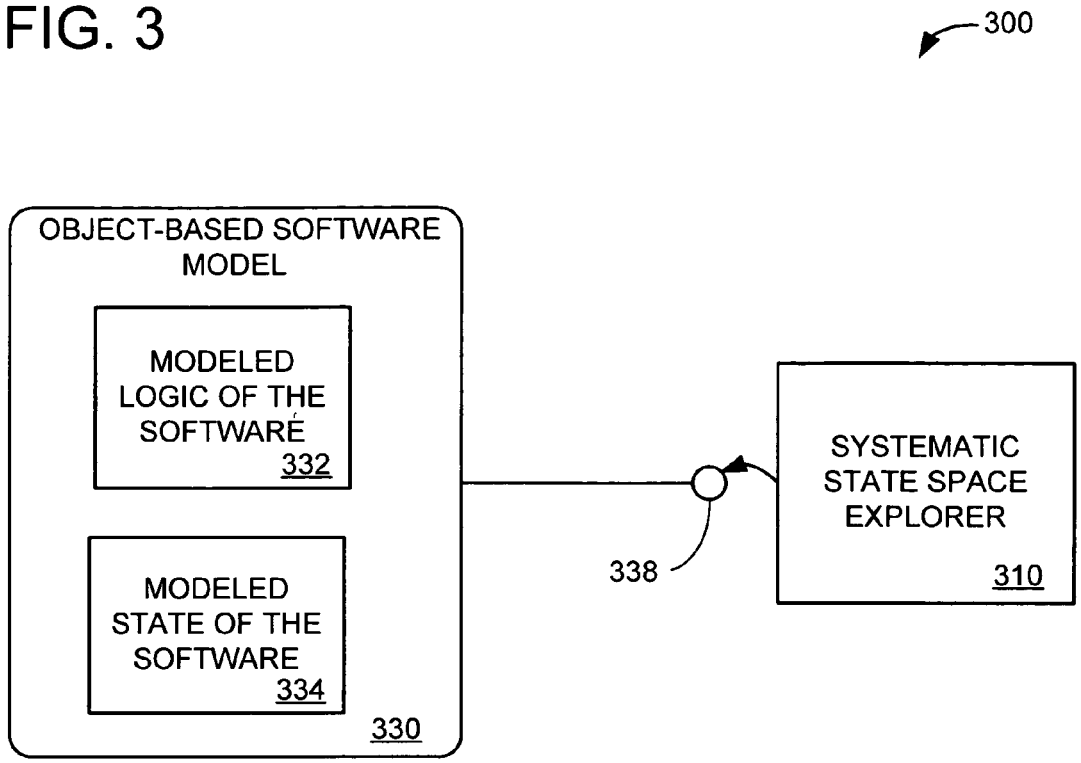
FIG. 3 is a block diagram showing an exemplary system for systematically exploring the state space of modeled software via an object-based software model.

Exemplary System for Systematically Exploring the State Space of Modeled Software FIG. 3 shows an exemplary system 300 for systematically exploring the state space of modeled software via an object-based software model 330. In the example, a systematic state space explorer 310 analyzes an object-based model 330 of software via one or more interfaces 338. Although shown as a single object, the object-based model 330 can include one or more objects, references to one or more objects, or some combination thereof.

In the example, the object-based model 330 includes modeled logic 332 of the software and at least one modeled state 334 of the software model. The modeled logic 332 can model at least some of the logic of the modeled software (e.g., the software 112 of FIG. 1). The modeled state 334 of the software model represents a current state of the software model and models a possible state of the software to be tested. The interface 338 can be a standard interface accepting directives for initiating modeling functions.

The systematic state space explorer 310 can send directives to the object-based model 330 to systematically explore the state space (e.g., possible states) of the model, thus effectively exploring the state space of the software being tested. Because the systematic state explorer 310 can explore states in an automated way, it can achieve more exhaustive testing than that possible via manual testing techniques. However, if desired, an interactive state space explorer can access the object-based software model 330 to accept guidance from a human tester when exploring the state space.

EXAMPLE 7

Exemplary Method for Testing Software via an Object-Based Software Model

Figure 4:
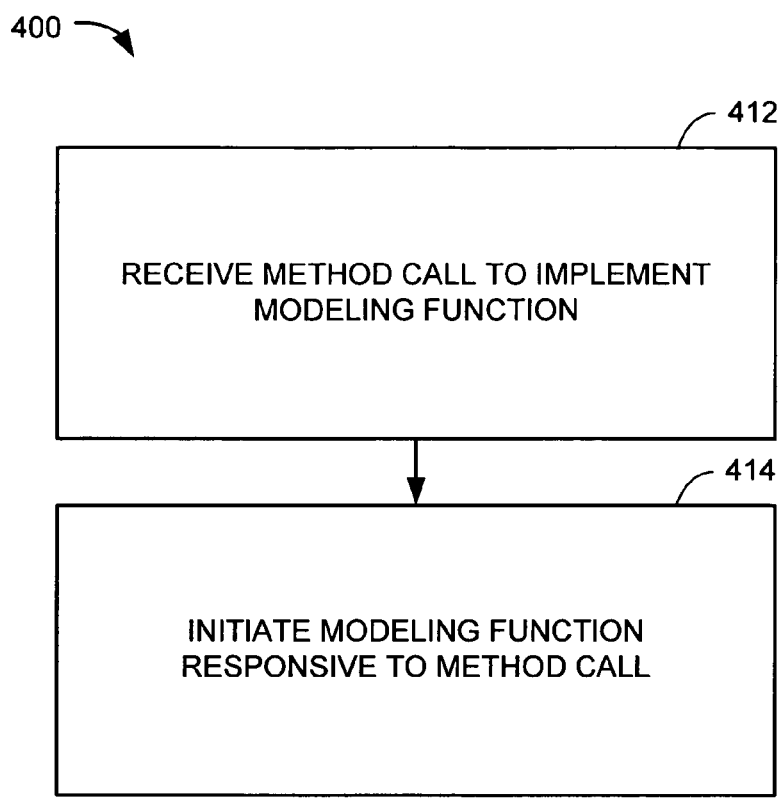
FIG. 4 is a flowchart showing an exemplary method for testing software via an object-based model.

FIG. 4 shows an exemplary method 400 for testing software via an object-based model (e.g., the object-based model 330 of FIG. 3). Before starting the method, a model of the software to be tested can be stored in one or more objects (e.g., instantiated from one or more object classes). The model can represent at least a subset of the logic of the software to be tested and a current state of the software model (e.g., modeling a possible state of the software to be tested).

At 412, a method call is received (e.g., via one of the one or more objects of the model 330) from a systematic state explorer (e.g., the systematic state explorer 310 of FIG. 300) to implement a modeling function.

At 414, the modeling function is initiated in response the method call.

EXAMPLE 8

Exemplary Modeling Functions

In any of the examples described herein, exemplary modeling functions can include a variety of functions for processing one or more states of the state-based model or modeling execution of the software to be tested.

A modeling function can include reporting the current state of the model. For example, a function can request the value of a particular variable, stack frame, program counter, or the like. The modeling function can also be a directive to take action so that the current state can be retrieved at a later point in time. Or, the function can be a request to compare two states (e.g., the current state with another state).

The modeling function can also include reporting various conditions within the model. For example, the modeling function can report the number of processes, whether such processes are blocked, whether there are pending possible alternate execution paths for processes, and the like.

The modeling function can also include directives for advancing execution of the model. The model can include logic for achieving controlled execution of the logic of the software model. For example, a directive can specify that a controlled execution of a particular process is to be initiated (e.g., on a step-by-step basis). Or, a directive can specify that a particular execution path (e.g., from a list of alternative paths) is to be taken.

During controlled execution, the current state of the software model can be modified (e.g., according to the executed instructions). Modifications to a state can be intercepted (e.g., by state modification interception logic) so that they can be recorded for later use.

The modeling functions described herein can be achieved by sending an appropriate method call to an object-based software model.

EXAMPLE 9

Exemplary Modeled Software State

The software state of the object-based software model can include a wide variety of items modeling a possible state of the software to be tested. For example, the software state can model global variables, local variables, or some combination thereof. Such variables can include modeled pointers to modeled data structures stored in a modeled heap (e.g., modeled queues, modeled linked lists, and the like).

In addition, the modeled software state can include the progress of execution of the software. For example, a modeled program counter can be stored.

The modeled software state can support modeling multiple processes. In addition, the modeled software state can support a stack (e.g., supporting multiple stack frames) for each of the processes.

The structures in modeled memory can be supported via modeling primitives. For example, sets, channels, or instantiated objects of an object class can be explicitly modeled without having to combine other primitives to achieve modeling. As a result, source language primitives in the software to be tested can be efficiently represented.

EXAMPLE 10

Exemplary Modeled Logic of Software Model

In any of the examples described herein, the object-based software model can include modeled logic (e.g., the logic 334 of FIG. 3) modeling at least a subset of the logic of the software to be tested. For example, if the software to be tested includes a statement assigning a value to a particular global variable, the logic of the object-based software model can include logic modeling such a statement, which assigns the value to a modeled version of the global variable.

In some cases, logic of the software to be tested need not be explicitly modeled. For example, if a branching statement depends on the results of a calculation, a database access, or a choice by a user, the model can simply indicate that a number of possible alternative execution paths are present, without having to explicitly model (e.g., contain logic for performing) the calculation, database access, or user choice. During systematic state space exploration, the state of the software can be explored for each of the possible execution paths to adequately explore the state space without regard to the logic that chooses between the paths.

The object-based software model can assist in the exploration process by indicating which of the alternative execution paths, if any, are pending. Such paths are sometimes called "choices." When modeling the software, an enumeration of the choices can be implemented as a native (e.g., "choose") statement specifying the choices as alternatives.

EXAMPLE 11

Figure 5:
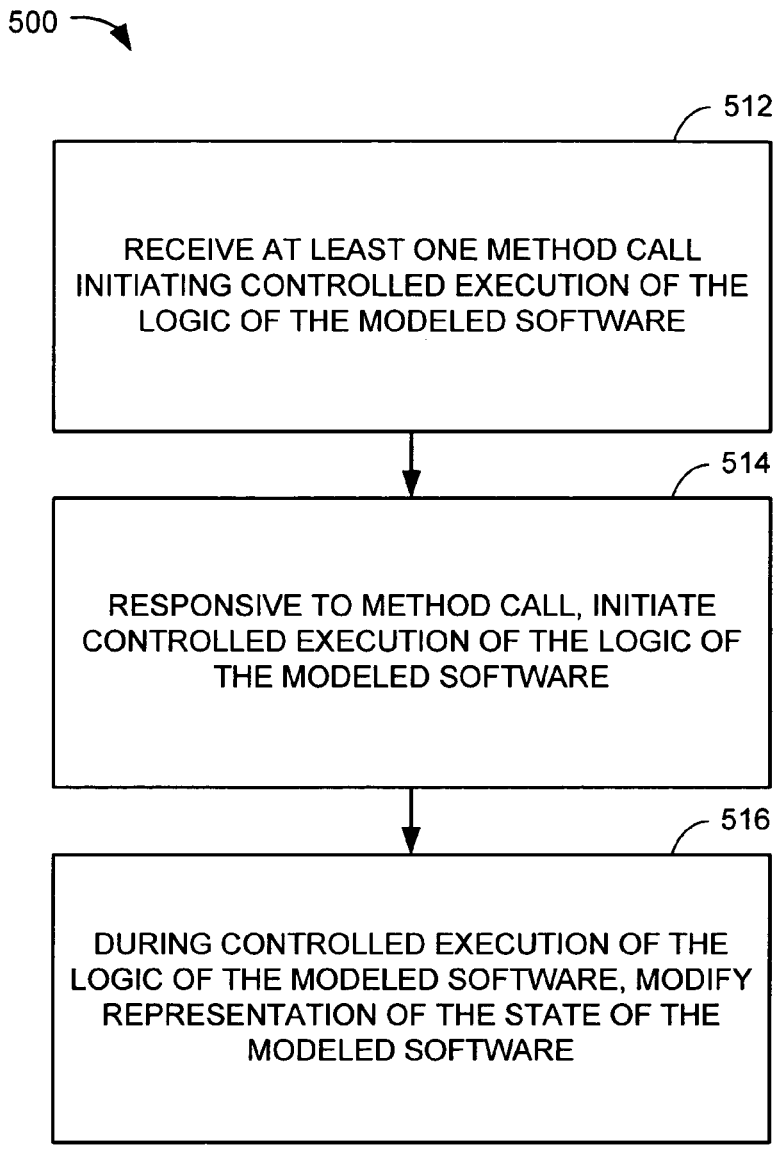
FIG. 5 is a flowchart showing an exemplary method for testing software via controlled execution of an object-based model.

Exemplary Method of Testing Software via Controlled Execution of an Object-Based Model FIG. 5 shows an exemplary method 500 for testing software via controlled execution of an object-based model.

At 512, at least one method call to initiate controlled execution of the logic of the modeled software program (e.g., the logic 332 of FIG. 3), is received (e.g., by the object-based software model).

At 514, controlled execution of the logic of the modeled software is initiated in response to the received method call. For example, controlled execution of the logic can take the form of executing one or more instructions of the modeled program, after which execution stops.

At 516, the representation of the state of the modeled software is modified during the controlled execution of the logic of the modeled software. The state of the modeled software may change according to the instructions executed. State changes can be intercepted and recorded for later use (e.g., to recover the state).

EXAMPLE 12

Exemplary Class Hierarchy for an Object-Based Model

An object-based software model (e.g., the model 122 of FIG. 1) can be generated via a variety of object classes. For example, objects can represent the current state of the software model, modeled processes, and the like.

Figure 6:
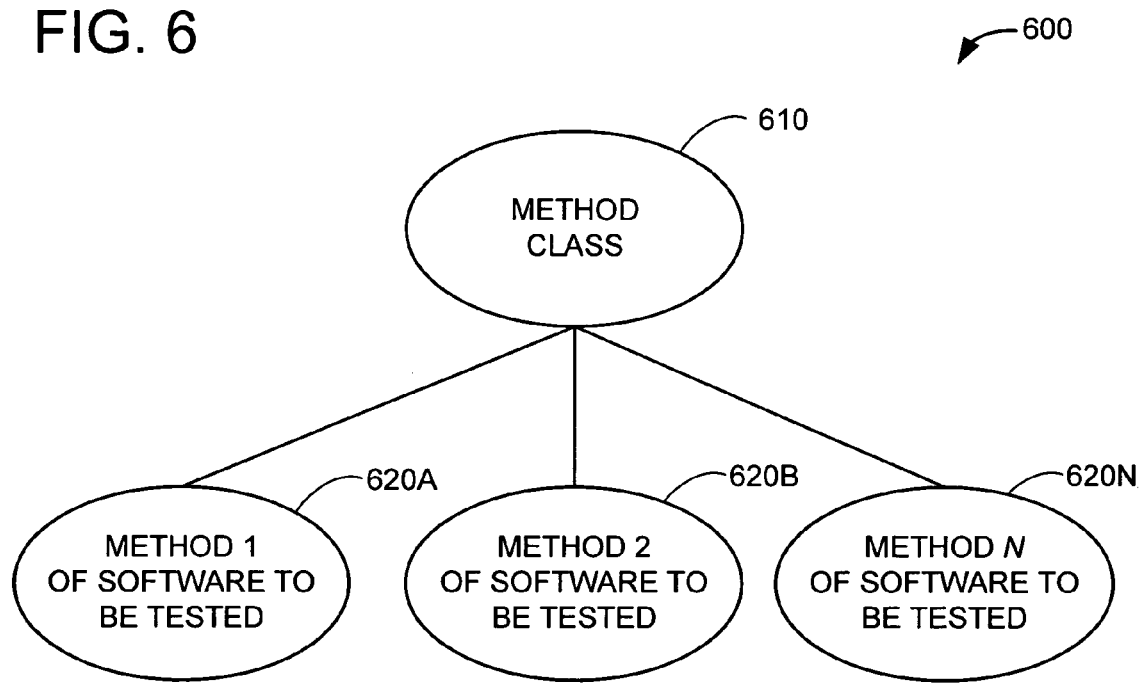
FIG. 6 is a block diagram showing part of an exemplary class hierarchy used for generation of an object-based software model.

FIG. 6 shows part of an exemplary class hierarchy 600 for generating an object-based software model. In the example, a base class 610 for representing a generic method (e.g., member function) of an object is defined. When generating (e.g., compiling) the object-based model, the child classes 620A-N can be defined as derived from the base class 610. For example, if an object "Account" has a method "foo( )" in the software to be tested, an object class 620A can be defined for modeling calls to foo( ).

Subsequently, during modeled execution, when a call to foo( ) is invoked, an instance of the object class 620A can be created and filled with the details concerning the method call (e.g., the parameters). The object can then be pushed onto the stack for the invoking process (e.g., via invocation of an object modeling the process invoking the method call).

Similarly, a class hierarchy can be used for data structures. For example, a base class modeling generic sets can have derived classes that model particular sets of the software being tested.

In this way, the logic generic to an action (e.g., during modeled execution) or data structure can be defined in a base class. When building an object-based model, the model generator can define more specific classes directed to actions or data structures of the software being tested.

EXAMPLE 13

Exemplary Fingerprinting of States

In order to facilitate comparison of states, the software testing system can support a fingerprinting technique that produces a value that can be compared against other such values to see if two states are the same. For example, the current state can be serialized and used to generate a hash value that has a very low probability of collision with other values. The fingerprint can be stored when exploring the state space in place of storing the entire state. If a state is encountered for a second time, further exploration along the present execution path may not be necessary.

EXAMPLE 14

Exemplary Architecture for a Supporting an Object-Based Software Model

Figure 7:
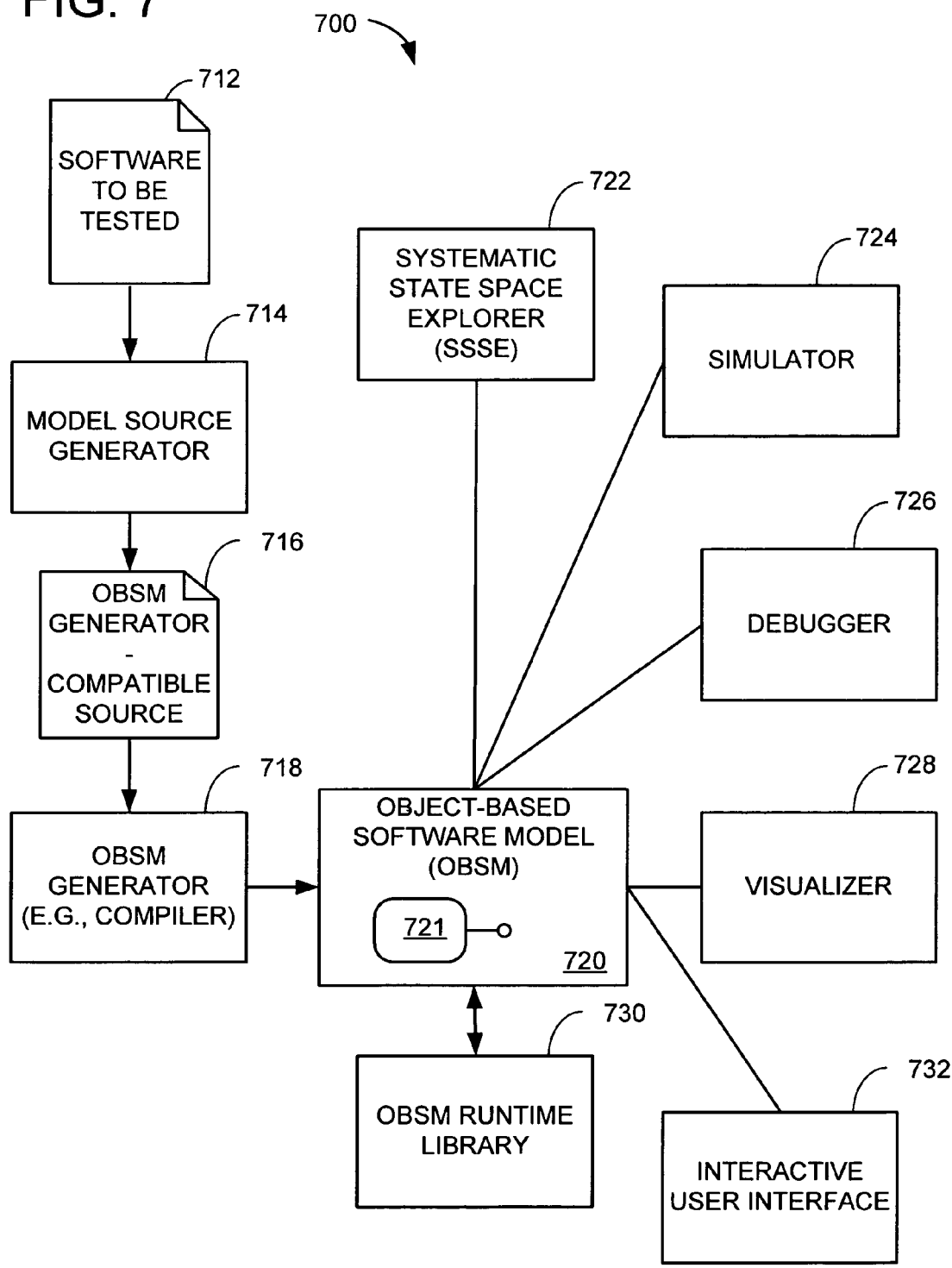
FIG. 7 is a block diagram showing an exemplary architecture for an infrastructure supporting an object-based software model ("OBSM").

FIG. 7 shows an exemplary architecture 700 for an infrastructure supporting an object-based software model ("OBSM"). In the example, software to be tested 712 is used as input by a model source generator 714 (sometimes called a "model extractor"), which provides as output OBSM generator-compatible source code 716. The OBSM generator-compatible source code 716 may then be used by an OBSM generator (e.g., a compiler) 718 to generate the object-based software model 720, which includes class definitions for one or more objects 721.

A systematic state space explorer (SSSE) 722 can explore the state space of the object-based software model 720 to model the possible states of the software to be tested 712. A simulator 724 and a debugger 726 can also be used to interact with the object-based software model 720. A visualizer 728 can present visualization of results (e.g., a UML activity or a call graph).

The object-based software model 720 can interact with a runtime library 730. The object-based software model can also be used by an interactive user interface 732, by which the state space can be explored manually by a human software tester.

EXAMPLE 15

Exemplary Arrangement of an Object-Based Software Model

In any of the examples described herein, a generated object-based software model can include an object of type "state" with the properties and methods shown in Table 1.

TABLE 1

Properties and Methods of object "state"

| Name | Description |
| --- | --- |
| NumProcesses | gives the number of active processes in the State |
| LastProcessExplored | gives the last process that was explored by the SSSE |
| RunnableProcesses[p] | returns true if process p is not blocked in the current state |
| Execute(p) | executes process p in the current state for one atomic step and returns a new state |

The equality operator for the State class can be overridden to test equality using a fingerprint. The fingerprint can have the property that if state s1 is a symmetric equivalent of state s2, then fingerprint(s1)=fingerprint(s2) and that if fingerprint(s1)=fingerprint(s2), then states s1 and s2 are equivalent with a high probability.

Because states are compared frequently and the state vector is potentially large, the use of fingerprints is advantageous. Further, after the immediate children of a state have been generated, the full state representation may be discarded, provided the fingerprint is retained.

Using this interface, a depth-first SSSE can be implemented as shown in Table 2.

TABLE 2

Depth—First Exploration

```
private void doDfs( ){
    while(stateStack.count > 0){
        State s = (State) stateStack.Peek( );
        bool foundSuccessor = false;
            // find the next process to execute and execute it
            for (int p = s.LastProcessExplored + 1; p < s.NumProcesses; p++){
                    if(s.RunnableProcesses[p]{
                        State news = s.Execute(p);
                        if(!stateHash.contains(newS)){
                            stateHash.add(newS);
                            stateStack.push(newS);
                            foundSuccessor = true;
                            break;
                        }
                    }
            }
        if(!foundSuccessor)
            stateStack.Pop( );
    }
}
```

In the example, the SSSE invokes a single method "execute" to execute a process for one atomic step. The execution semantics of the process, which includes complicated activities such as process creation, function call, exceptions, and dynamic memory allocation, can be supported by the implementation of the execute method. The SSSE is thus decoupled from the intricate execution semantics.

The SSSE can store fingerprints of visited states in a hash table stateHash. When visiting each new state, the SSSE first checks if the fingerprint of the new state is already present in the stateHash and, if present, can avoid re-exploring the new state. When the explorer reaches an erroneous state (e.g., indicated by a failed assert), the entire trace that leads to the error is present in the explorer's depth-first search stack, and the trace can be displayed at the source level.

EXAMPLE 16

Exemplary Language

Figure 8:
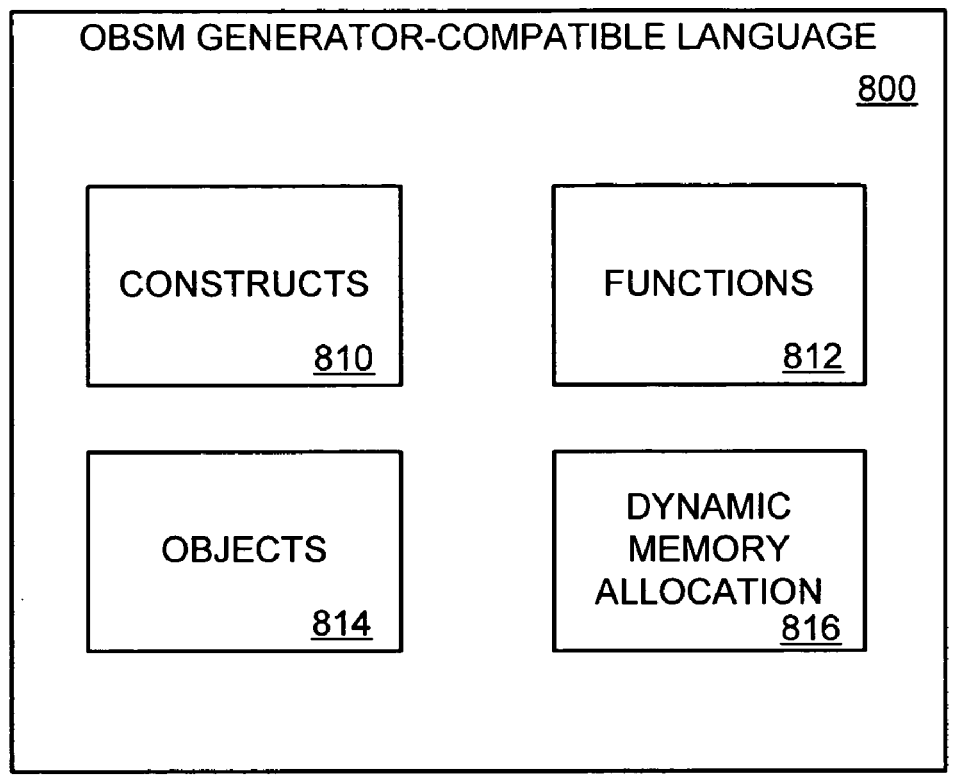
FIG. 8 is a block diagram showing an exemplary language for use as OBSM generator-compatible source.

FIG. 8 illustrates an exemplary language 800 for use as the OBSM generator-compatible source (e.g., the source 716 of FIG. 7). In the example, the language 800 comprises constructs 810, functions 812, objects 814, and dynamic memory allocation 816.

In the example, the language 800 can provide several features to support automatic generation of models from programs written in common programming languages. For example, the language 800 can support a basic asynchronous interleaving model of concurrency with both shared memory and message queues. In addition to sequential flow, branching, and iteration, the language 800 also supports function calls and exception handling. Functions can be called asynchronously. An asynchronous call returns to the caller immediately, and the callee runs as a fresh process in parallel with the caller. The language 800 can support primitive and reference types.

The language 800 can provide features to support abstraction and efficient state exploration. Sequences of statements can be bracketed as atomic. This is essentially a directive to not consider interleavings with other processes while any given process executes an atomic sequence. In the example, it is the responsibility of the model source generator (e.g., the generator 714 of FIG. 7) to ensure that the source code satisfies such atomicity specifications, implemented possibly using locks.

The language 800 can support a set data structure. Sets are used to represent collections where the ordering of objects is not important, thereby reducing the number of potentially distinct states to be explored.

The language 800 can support a non-deterministic construct called choose. This construct can be used to non-deterministically pick an element out of a finite set of integers, enumeration values, or object references. The choose construct has several uses. For example, it can be used to abstract irrelevant data from the code and model conditionals that are dependent on such irrelevant data. It can also be used to support region-based alias analysis, where a region-type system and a model checker can cooperate to handle pointer-aliasing in a sound manner.

EXAMPLE 17

Exemplary Memory Model for an Object-Based Software Model

Figure 9:
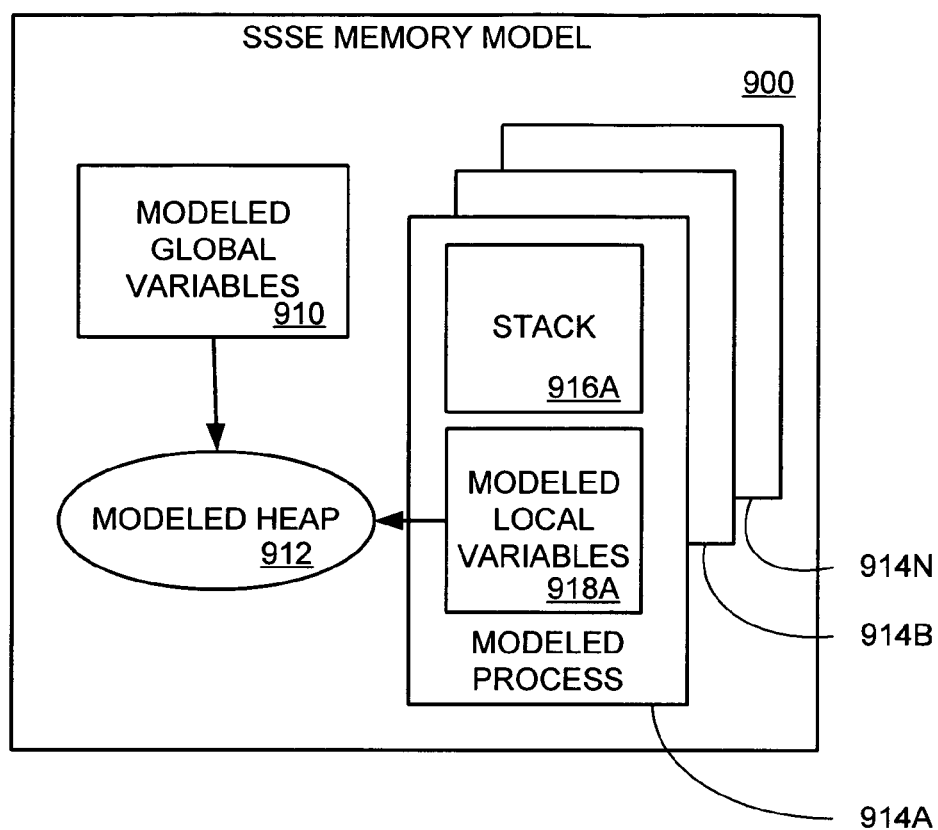
FIG. 9 is a block diagram showing an exemplary memory model for use by an object-based software model.

FIG. 9 shows an exemplary memory model 900 for use by an object-based software model (e.g., the model 720 of FIG. 7). In the example, the memory model 900 includes modeled global variables 910, a modeled heap 912, and one or more modeled processes 914A-N. The modeled heap 912 can be shared, and the processes 914A-N can each have a separate stack. For example, the process 914A can have a stack 916A. The processes can be tracked via a process list.

In the example, there is one stack per active process. In practice, each stack can include one or more stack frames, recording the sequence of calls (e.g., procedure or function calls) that led to the current execution point. The current call can be at the top of the stack. Stack frames can contain local variables (e.g., modeled local variables 918A of process 914A) and a frame pointer that points to the caller of the current stack frame. Local variables can contain pointers to heap objects that are allocated dynamically as a result of modeling program execution.

In the example, global variables can be shared across the processes. Global areas may consist of static members of classes that are shared across class instances and execution processes. The global variable region may be treated as a special stack frame that is accessible to the executing processes. Global variables may point to heap objects just as local variables do.

In the example, the modeled heap 912 can be shared across processes. The state may contain a common memory region shared by all processes for dynamically allocated objects. It may be implemented as an expandable array of objects. Pointers (in stacks, globals, and heap objects) may simply be indices into the array.

EXAMPLE 18

Exemplary Method for Modeling Software via a Memory Model

Figure 10:
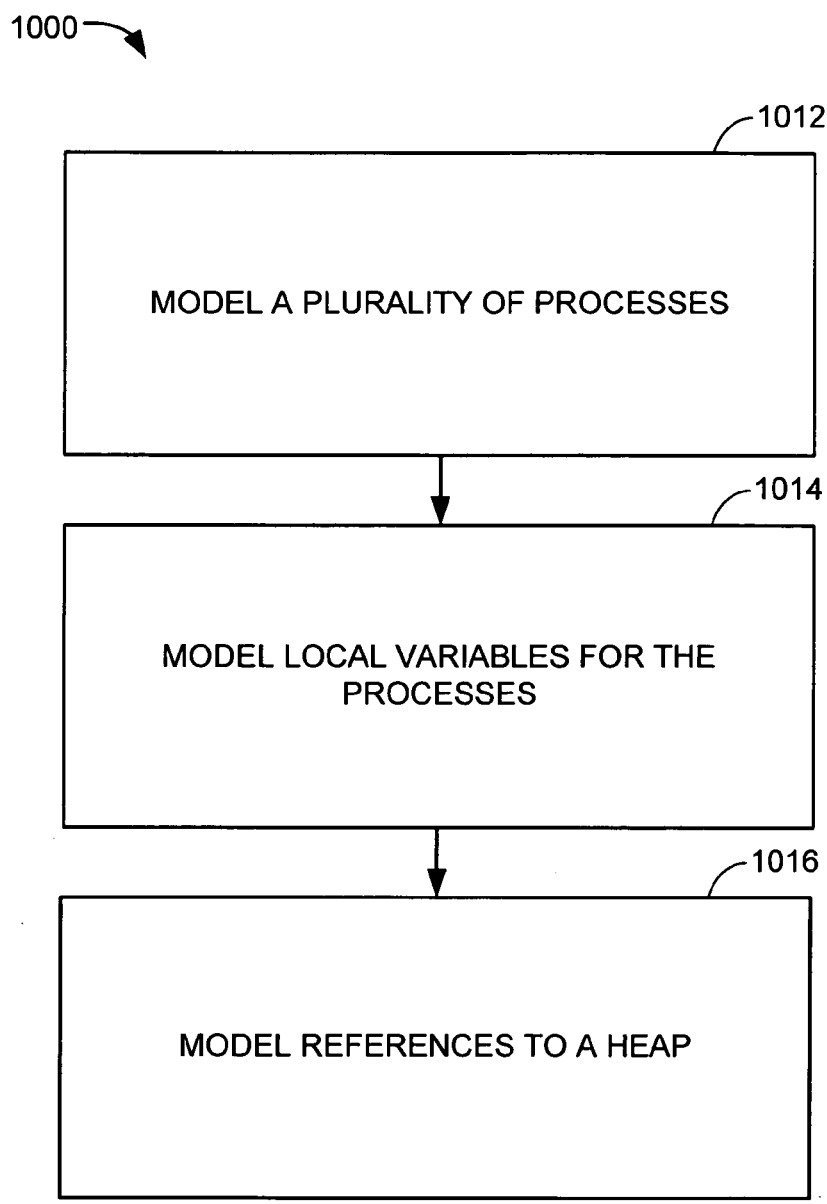
FIG. 10 is a flowchart showing an exemplary method for modeling software via a memory model for an object-based software model.

FIG. 10 shows an exemplary method 1000 for modeling software via a memory model for an object-based software model.

At 1012, a plurality of processes are modeled. Each process can have a respective stack.

At 1014, one or more local variables for the processes are modeled. For example, local variables can be stored on the stack of the related process.

At 1016, one or more references to a heap are modeled. For example, modeled pointers to a heap can be mapped to pointers to a modeled heap.

EXAMPLE 19

Exemplary Object-Based Software Model

Figure 11:
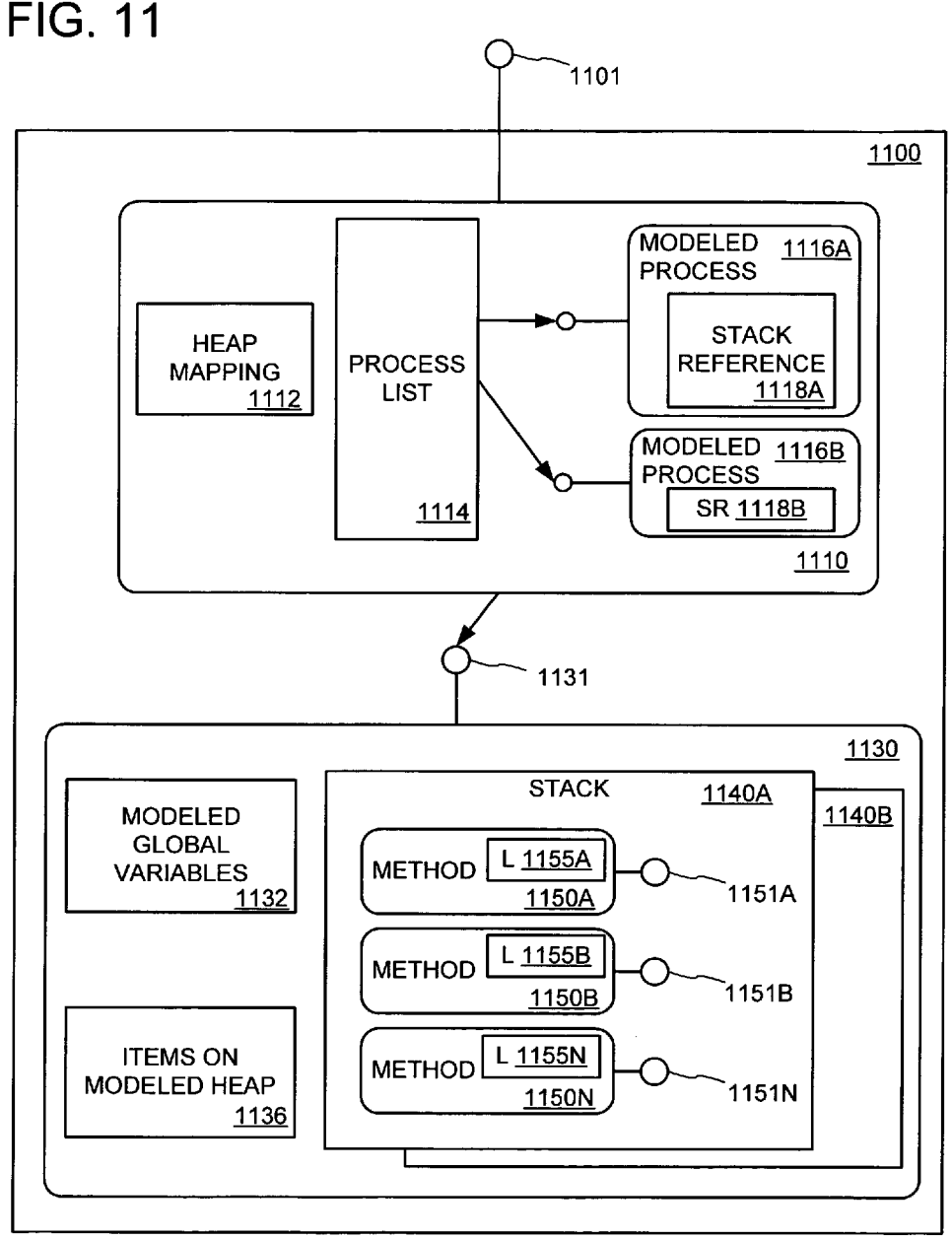
FIG. 11 is a block diagram showing an exemplary object-based software model including a state object and an application object.

FIG. 11 shows an exemplary object-based software model 1100 that can be used in any of the examples described herein. In the example, the model 1100 includes two objects: a state object 1110 and an application object 1130. Other arrangements are possible. For example, fewer, more, or different objects can be used. For example, in practice, the state object 1110 can be implemented as a lightweight object calling into a more detailed object (e.g., sometimes called the "state implemention" or "stateImp1" object).

In the example, the state object 1110 can be accessed (e.g., via a systematic state space explorer or other source) via the interface 1101. For example, the interface 1101 can accept method calls to perform any of the modeling functions described herein (e.g., reporting the number of processes, initiating controlled execution, and the like).

The state object 1110 includes a heap mapping 1112. The heap mapping 1112 can map modeled pointers (e.g., integers) into a heap to pointers into a modeled heap (e.g., items on the modeled heap 1136). In this way, the object-based software model can contain native support for modeling a heap.

In addition, a process list 1114 can keep a list of one or more modeled process objects 1116A-B. The modeled process object 1116A can model a process and can include, for example, a respective stack reference 1118A (or 1118B). The stack reference 1118A can include a reference to the respective stack (e.g., the stack 1140A of the process), including an entry point (e.g., where to begin or resume execution), the top of the stack, and the like. As described below, the stack itself comprises objects modeling method calls.

In the example, the application object 1130 can be accessed via calls to the interface 1131 (e.g., method calls to manipulate the stack, the modeled heap, and so forth). One or more stacks 1140A-B can be represented. The stack 1140A can include one or more stack frames (e.g., storing local variables and parameters for procedure, function, or method calls).

In the example, method calls are modeled by method objects 1150A-N (e.g., constructed according to the class hierarchy 600 of FIG. 6), which can be accessed via the respective interfaces 1151A-N. In the example, the logic of the software to be tested 1155A-N can be contained within the respective method objects. For example, if a method in the software to be tested includes logic to assign a value to a global variable, such logic can be incorporated into the method object modeling the method.

The modeled global variables 1132 can be implemented as a special stack frame. The modeled heap 1136 can store items on the modeled heap (e.g., modeled queues, modeled linked lists, and the like).

EXAMPLE 20

Exemplary Method for Testing Software via an Object-Based Software Model

Figure 12:
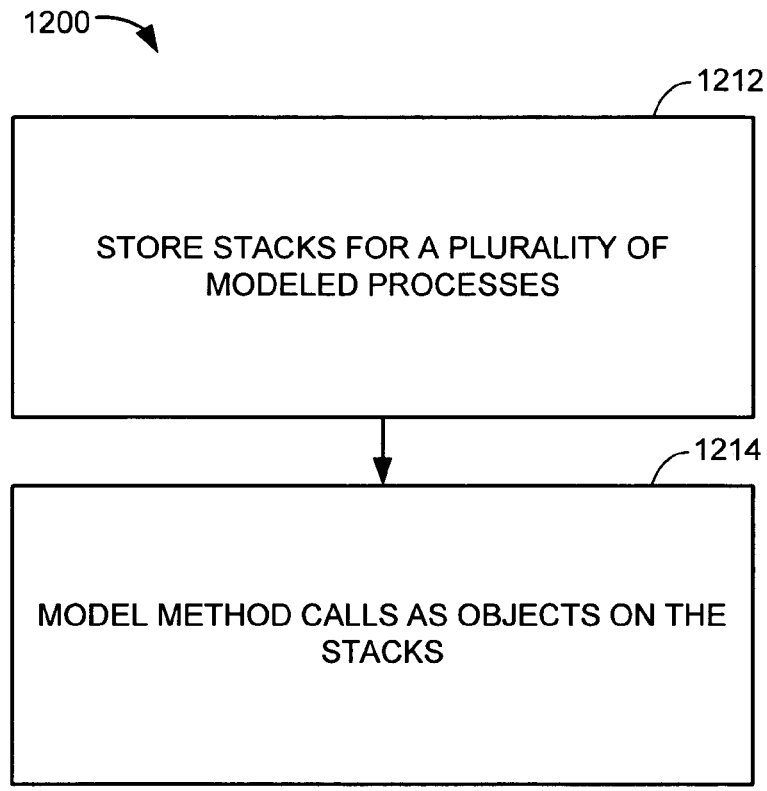
FIG. 12 is a flowchart showing an exemplary method for testing software via an object-based software model, such as that of FIG. 11.

FIG. 12 shows an exemplary method for testing software via an object-based software model (e.g., the model 1100 of FIG. 11).

At 1212, stacks are stored for a plurality of modeled processes.

At 1214, method calls are modeled as objects on the stacks.

EXAMPLE 21

Exemplary Model Extraction

In any of the examples described herein, a model of a concurrent program can be generated from the software to be tested. The model can preserve much of the control structure of the source concurrent program. The model can be generated automatically (e.g., via model generation software) and modularly from programs written in common programming languages such as C, C++, and the VISUAL BASIC language. The structure of the source code, which can be preserved in the model, can thus be exploited by a SSSE to optimize state space exploration of the model and, thus, the source code. Because the state vector of the SSSE is not of a fixed size, interactions between multiple processes, each having its own stack, may be analyzed.

EXAMPLE 22

Exemplary Programming Flaws

In any of the examples described herein, analysis of concurrent software can include detecting programming flaws of the software. Exemplary programming flaws can include a wide variety of conditions, widely referred to as "bugs." To detect programming flaws, programmers have developed a variety of mechanisms.

For example, one such mechanism is a specified invariant. An exemplary implementation of a specified invariant is called an "assert." The assert indicates a condition (i.e., an assertion) that is believed to be invariant at a particular location within the software. If the condition is false for any possible set of execution paths, a programming flaw is indicated. In such a case, the assert is said to have failed.

For example, a programmer can include the following assertion in the programming code:

assert (pAction != NULL)

If it is possible that the software can reach the location of the assertion, and pAction is NULL (i.e., the assertion is false and the invariant is not correct), the assert has failed. Thus, a programming flaw is indicated.

In practice, the assert can be implemented as a runtime check (e.g., during debugging), or the assert can be used during modeling of the software. For example, the assert mechanism can be used in any of the examples described herein. If it is determined that the assert fails during state space exploration, a programming flaw is indicated.

Details about the flaw can be produced to aid in debugging the software. For example, a location of the assert within the software, the current state, and execution history can be indicated by the state space exploration infrastructure. The programmer can use the information to determine the cause of the assertion failure.

EXAMPLE 23

Exemplary State Processing

During state exploration, a copy of previous states of the software to be tested (e.g., the modeled software) can be stored for a variety of reasons. For example, it may be desirable to compare two states to determine if a state has been reached before earlier during modeling (e.g., so that duplicative modeling can be avoided). Or, while exploring states, it may be desirable to return to a previous state (e.g., to explore another possible execution path or interleaving of processes). A state delta technique can be used to efficiently store a plurality of states. In this way, a complete copy of the states need not be kept.

EXAMPLE 24

Exemplary State Transition and State Delta

Figure 13A:
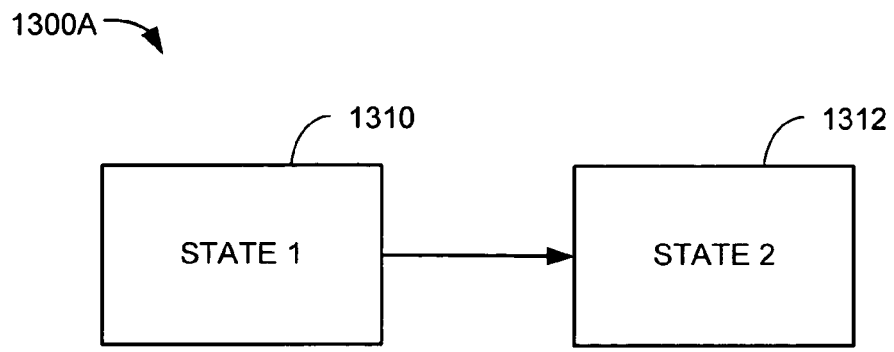
FIGS. 13A-C are block diagrams showing an exemplary state transition and state delta.

FIG. 13A shows an exemplary state transition 1300A during modeling via the techniques in any of the examples described herein. For example, during modeling, the state may transition from state 1 1310, to state 2 1312. The states 1310 and 1312 can include any combination of the state information described in any of the examples herein (e.g., global variables, stacks, the like, or some combination thereof).

Figure 13B:
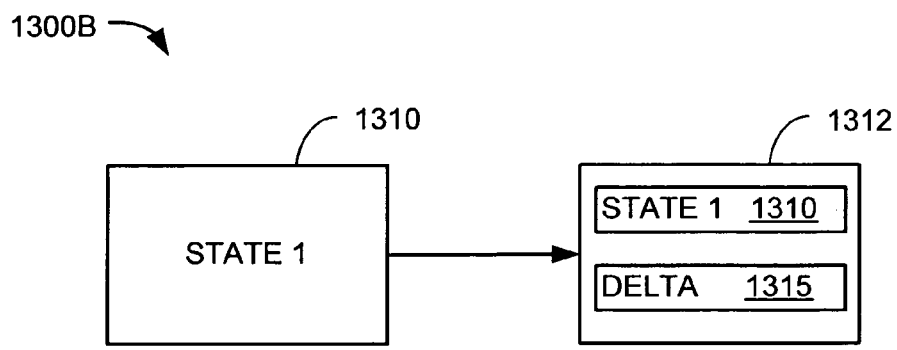

FIG. 13B shows how the states can be stored as data structures 1300B in one or more computer-readable media. In the example, state 2 1312 is represented as a combination of state 1 1310 and a state delta 1315. The state delta 1315 represents the difference (e.g., a set of modifications) between state 1 1310 and state 2 1312 and allows re-construction of state 2 1312 when given state 1 1310 and the delta. In practice, the delta 1315 may not be stored with state 1 1310. For example, a reference to state 1 1310 can be used instead.

In practice, a large number of states can be so represented (e.g., by storing successive deltas). For example, a list of deltas and a corresponding base state can be stored. Further, deltas can be stored as portions of a delta (e.g., one or more deltas for a stack, one or more deltas for global variables, and so forth).

Figure 13C:
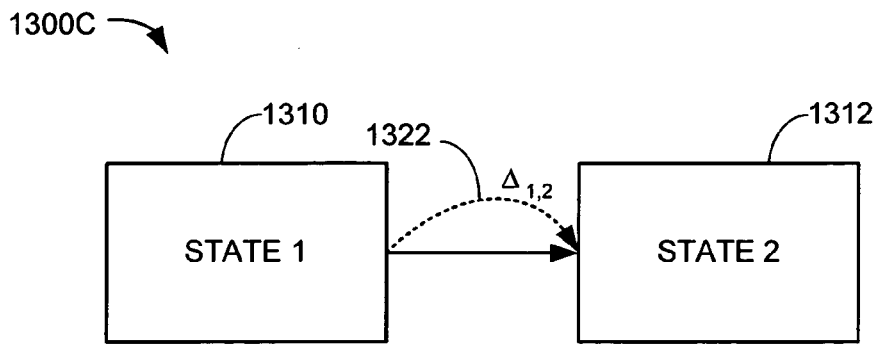

FIG. 13C shows a state transition 1300C using a delta notation indicating that the states are stored according to the arrangement of FIG. 13B. In the example, a state delta notation 1322 indicates that state 2 1312 is stored as a representation of (e.g., a reference to) the previous state, state 1 1310, and a delta (e.g., the delta 1315).

EXAMPLE 25

Exemplary Method for Storing State Deltas

Figure 14:
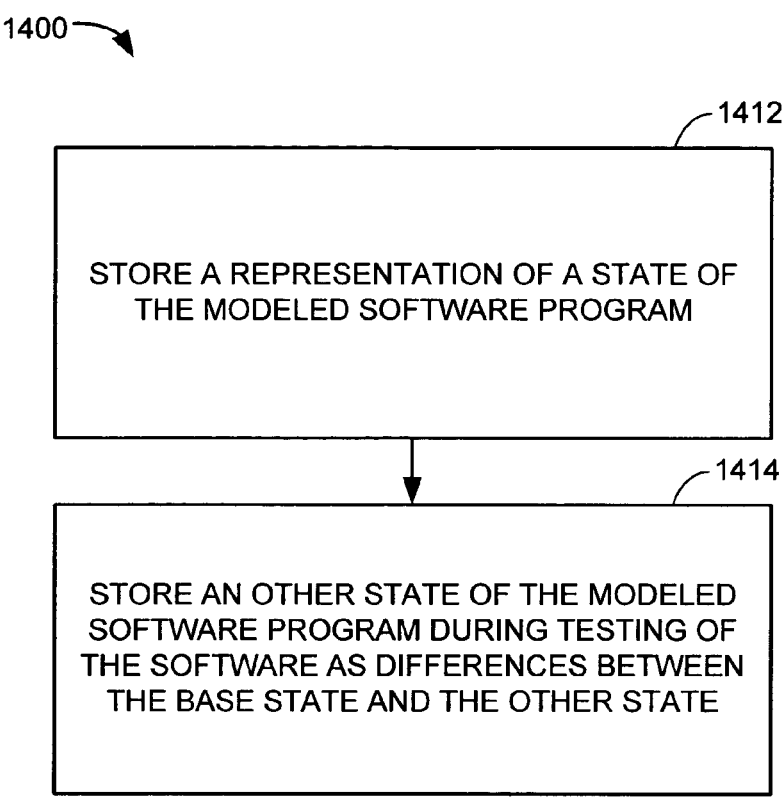
FIG. 14 is a flowchart showing an exemplary method for storing state deltas.

FIG. 14 shows an exemplary method 1400 for performing a state transition in a model of a concurrent software program.

At 1412, a representation of a state (e.g., a base state) of the modeled software program is stored.

At 1414, an other state of the modeled software is stored during testing. The other state comprises the difference (e.g., set of modifications) between the state and the other state. In one embodiment, the other state is a subsequent state. In an alternative embodiment, the other state is a previous state.

EXAMPLE 26

Exemplary Reverse State Delta

Figure 15A:
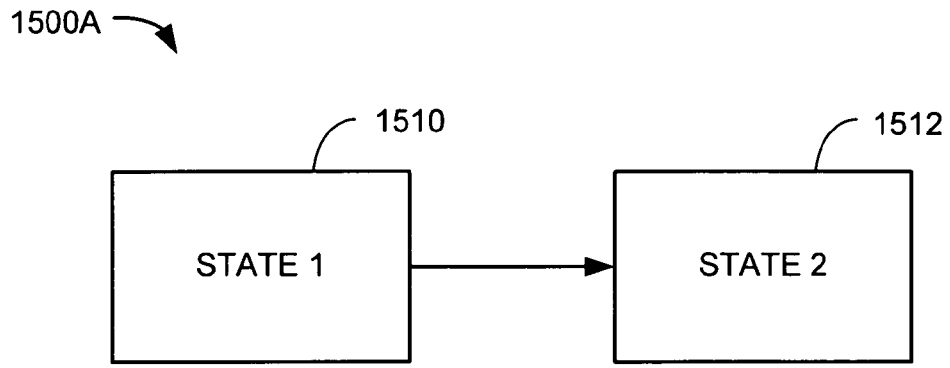
FIGS. 15A-C are block diagrams showing an exemplary reverse state delta.

Although the above examples show differences between a base state and a subsequent state, a reverse state delta technique can alternatively be employed. FIG. 15A shows an arrangement 1500A involving two states 1510 and 1512 (e.g., those of FIG. 13A). However, when represented, the two states can be stored as data structures in one or more computer-readable media as shown in FIG. 15B.

In the example, state 1 1510 is represented as a combination of state 2 1512 and a state delta 1515. The delta 1515 represents the difference (e.g., set of modifications) between state 2 1512 and state 1 1510 and allows re-construction of state 1 1510 when given state 2 1512 and the delta 1515. In practice, the delta 1515 may not be stored with state 2 1512. For example, a reference to state 2 1512 can be used instead.

In practice, a large number of states can be so represented (e.g., by storing successive deltas). For example, a list of deltas and a corresponding base state can be stored. Further, deltas can be stored as portions of a delta (e.g., one or more deltas for a stack, one or more deltas for global variables, and so forth).

Figure 15B:
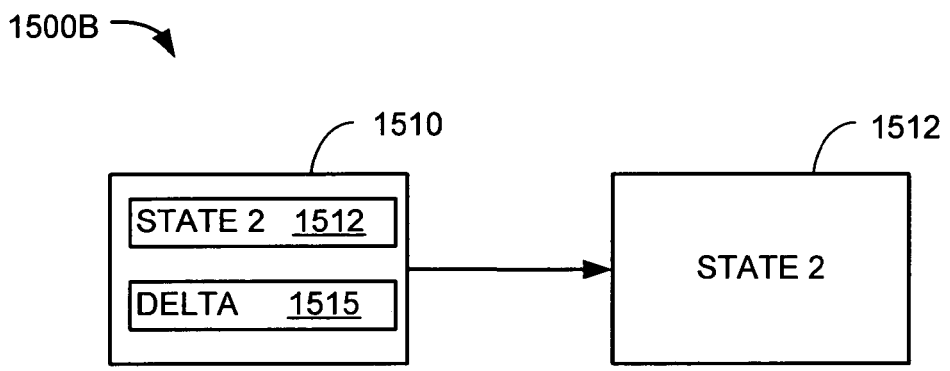
Figure 15C:
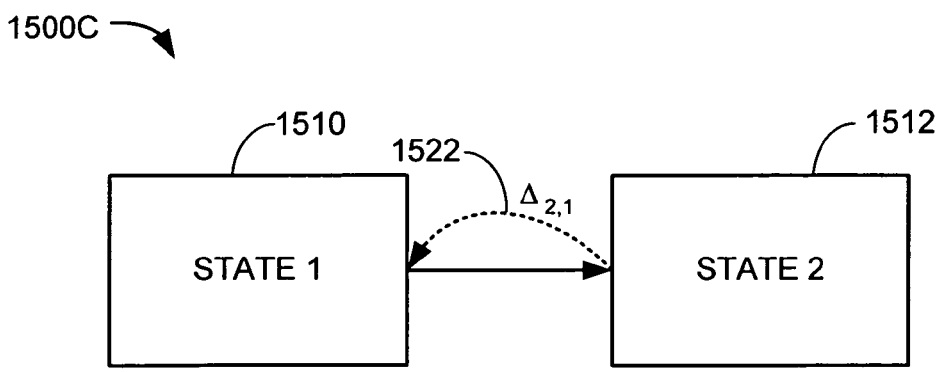

FIG. 15C shows a state transition 1500C using a delta notation indicating that the states are stored according to the arrangement of FIG. 15B. In the example, a state delta notation 1522 indicates that state 1 1510 is stored as a representation of (e.g., a reference to) the subsequent state, state 2 1512, and a delta (e.g., the delta 1515).

EXAMPLE 27

Exemplary Reverse State Delta Advantages

The reverse state delta arrangement can have a number of advantages. For example, when traversing a state tree in a depth-first search, the reverse state delta can be used to easily backtrack (e.g., move toward the root state) of the state tree. Also, when determining whether a set of instructions can be represented as a transaction (e.g., whether they are atomically modelable with respect to multithreaded execution of the software), it is sometimes not known that the instructions can be so represented until the statement after the transaction has ended (e.g., the first statement of the next transaction has been executed). Reverse state delta allows backtracking to the state before the new transaction has begun.

EXAMPLE 28

Exemplary Granularity

State deltas can be stored at differing levels of granularity. For example, the state delta can include a copy of the values that were changed during the state transition without keeping a copy of unchanged values. Thus, the amount of copy kept for state recovery can vary from a copy of a field (e.g., without copying other, unchanged fields), to a copy of a data structure storing the field (e.g., without copying other, unchanged data structures), to a copy of an object having the data structure (without copying other, unchanged objects), to a copy of the entire heap on which the object is stored.

Any point along the granularity continuum can be chosen when implementing state deltas. For example, an arrangement can keep copies of objects on the heap, individual stack frames of processes, and global variables as a whole. So, for example, a change to an object on the modeled heap will result in a copy of the object being stored as part of the state delta, without copying other, unchanged objects. Likewise, a change to a stack frame will result in a copy of the stack frame being stored as part of the state delta, without copying other, unchanged stack frames. Finally, a change to any global variable will result in a copy of the global variables being stored as part of the state delta. Alternatively, the global variables can be factored out (e.g., to copy less than all the global variables).

EXAMPLE 29

Exemplary Selectivity

State deltas need not be stored for every transition in state. For example, rather than maintaining complete history of every state change, state changes can be grouped together according to some criteria as desired. For example, it might be possible to treat a set of instructions as a transaction (e.g., the instructions are atomically modelable with respect to multi-threaded execution of the software). If so, during modeling, it may not be necessary to return to states between transaction boundaries.

Thus, the difference in state before and after execution of the set of instructions can be stored as a group in a single logical state delta. For example, when modeling software, a "check-in" can be received as an indication that the current state may need to be subsequently provided. Only those states at check-in need to be backed up. States between check-ins can be destructively updated.

An undo log can record actions that need to be carried out in order to revert destructive updates since the previous check-in.

EXAMPLE 30

Exemplary Log Optimization

When constructing the log between check-ins, later updates might cancel the observable effects of previous ones; thus it may be desirable to erase entries in the log, replace entries in the log, or both. For example, if a stack frame is modified and then popped off the stack, a log might track both the modifications to the stack frame and the stack frame as it existed when it was popped off the stack (e.g., so that it can be later pushed onto the stack). However, it is only necessary to track the stack frame one time between check-ins. So, the log can omit recording the pop and record the state of the frame at the time of the check-in.

Similarly, if a stack frame is pushed and popped between check-ins, a log might track both the frame push and frame pop (e.g., so that the pop and the push can be undone). However, it is not necessary to track either the push or the pop because there is no observable difference between the check-ins. Therefore, the log can omit any entries concerning the stack frame.

EXAMPLE 31

Exemplary State Delta Data Structures

Figure 16A:
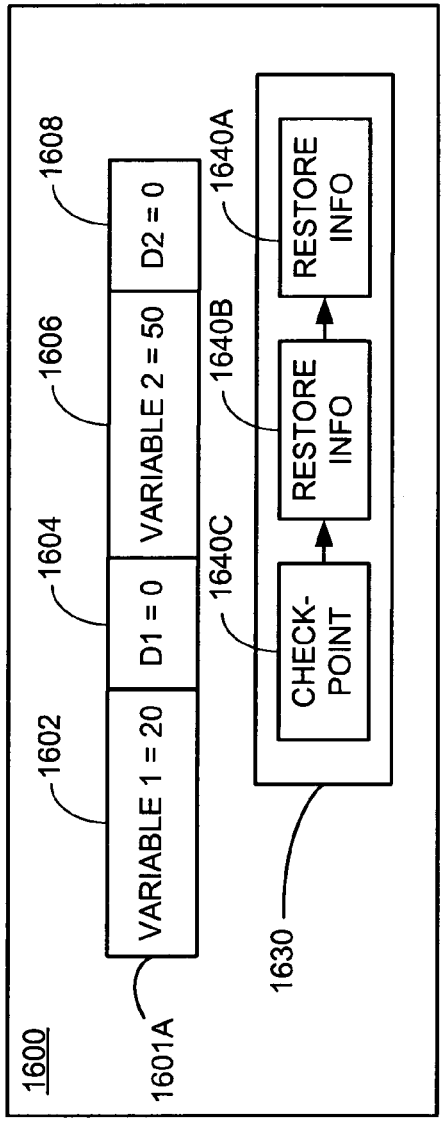

FIG. 16A shows an exemplary data structure 1600 for implementing state deltas. Current state 1601A includes two variables, each with a corresponding dirty bit. Variable 1 1602 has an initial value of 20, and the associated dirty bit D1 1604 has an initial value of 0. Variable 2 1606 has an initial value of 50, and the associated dirty bit D2 1608 has an initial value of 0. For purposes of illustration, deltas for each variable are stored. In practice, the level of granularity can be different (e.g., as described in Example 28).

An undo log 1630 contains information for restoring the state to a previous check-in. In the example, check-ins are noted by a checkpoint node 1640C. In practice, a different technique can be used. The restore info 1640B and 1640A allows backtracking to an earlier state (e.g., the previous check-in). In the example, the current state 1601A is destructively updated, and the restore info 1640B and 1640A records original values of the variables (e.g., values before the first destructive update between check-ins).

Figure 16B:
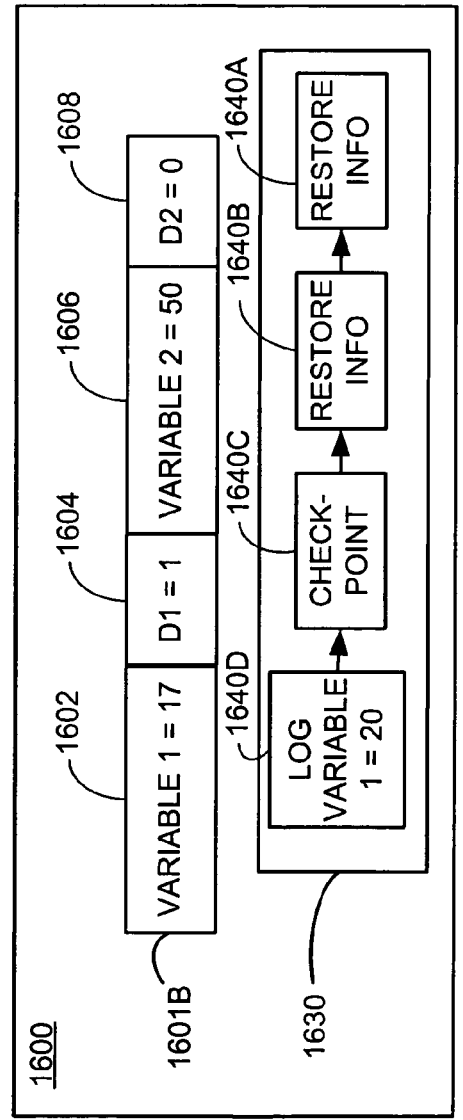

FIG. 16B shows the data structure 1600 after variable 1 1602 has been modified to 17 during modeled execution. Because the state 1601B has changed via a first destructive update to the previous state 1601A, the dirty bit D1 1604 has been set, and a new entry 1640D has been added to the undo log 1630. Dirty bit D2 1608 has not been set, however, because variable 2 1606 has not yet been modified since the last check-in.

FIG. 16C shows the data structure 1600 after variable 1 1602 has been changed to 5 and variable 2 1606 has been changed to 25 during modeled execution. Because the state 1601C has changed again via a destructive update to the previous state 1601B, resulting in modifications to both variables 1 1602 and 2 1606, both dirty bits D1 1604 and D2 1606 are set and a new entry 1640E has been added to the undo log 1630. The previous entry 1640D does not change because there has not been another check-in since the last recordation 1640D of a modification to variable 1 1602.

FIG. 16D shows the data structure 1600 after an indication of a check-in has been received. The dirty bits D1 1604 and D2 1608 have been set to 0, and the checkpoint 1640F has been added to the undo log.

To restore state, entries in the log up until the desired checkpoint can be used to restore values of modified variables.

EXAMPLE 32

Exemplary Method for Implementing State Deltas

Figure 17:
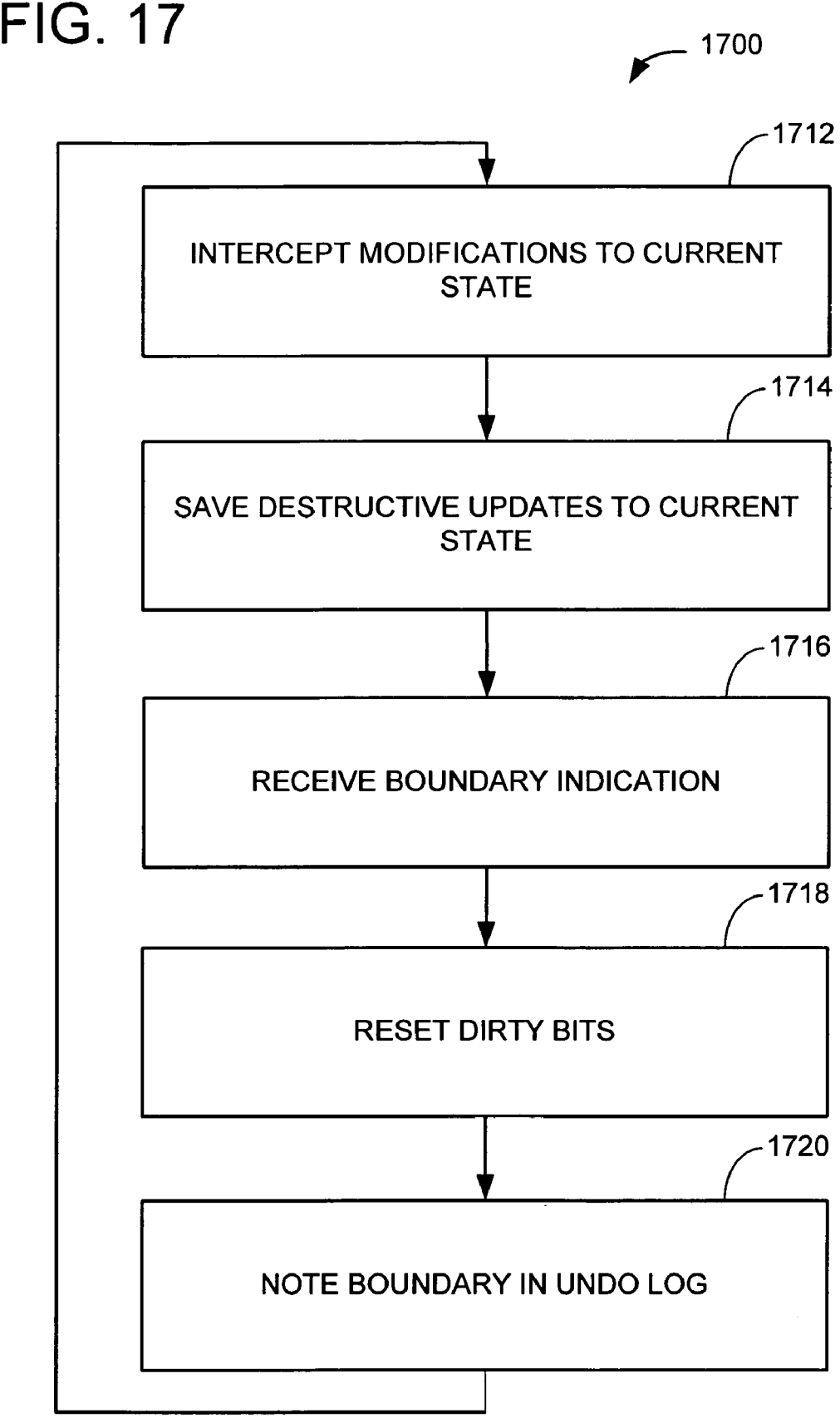
FIG. 17 is a flowchart showing an exemplary method for implementing state deltas.

FIG. 17 shows an exemplary method 1700 for implementing state deltas. For example, the method can employ the data structures of FIG. 16.

At 1712, modifications to a current state (e.g., of modeled software) are intercepted. Modifications to the current state can be intercepted as the current state transitions to a next state during modeling.

At 1714, destructive updates to the current state are saved. For example, information that is being destructively updated for the first time between check-ins can be backed up in an undo log to record actions that need to be carried out in order to subsequently revert the destructive updates.

At 1716, a check-in indication is received, indicating that it may be desirable to return to the current state. In response, the method can take action to subsequently provide the current state.

In the example, at 1718, corresponding dirty bits are reset, and at 1720, the checkpoint is noted in the undo log.

Subsequently, if additional updates to the state are made during modeling, the state at the time of check-in (e.g., when the checkpoint was placed in the undo log) can be provided by consulting the log.

EXAMPLE 33

Exemplary State Tree Exploration

Figure 18:
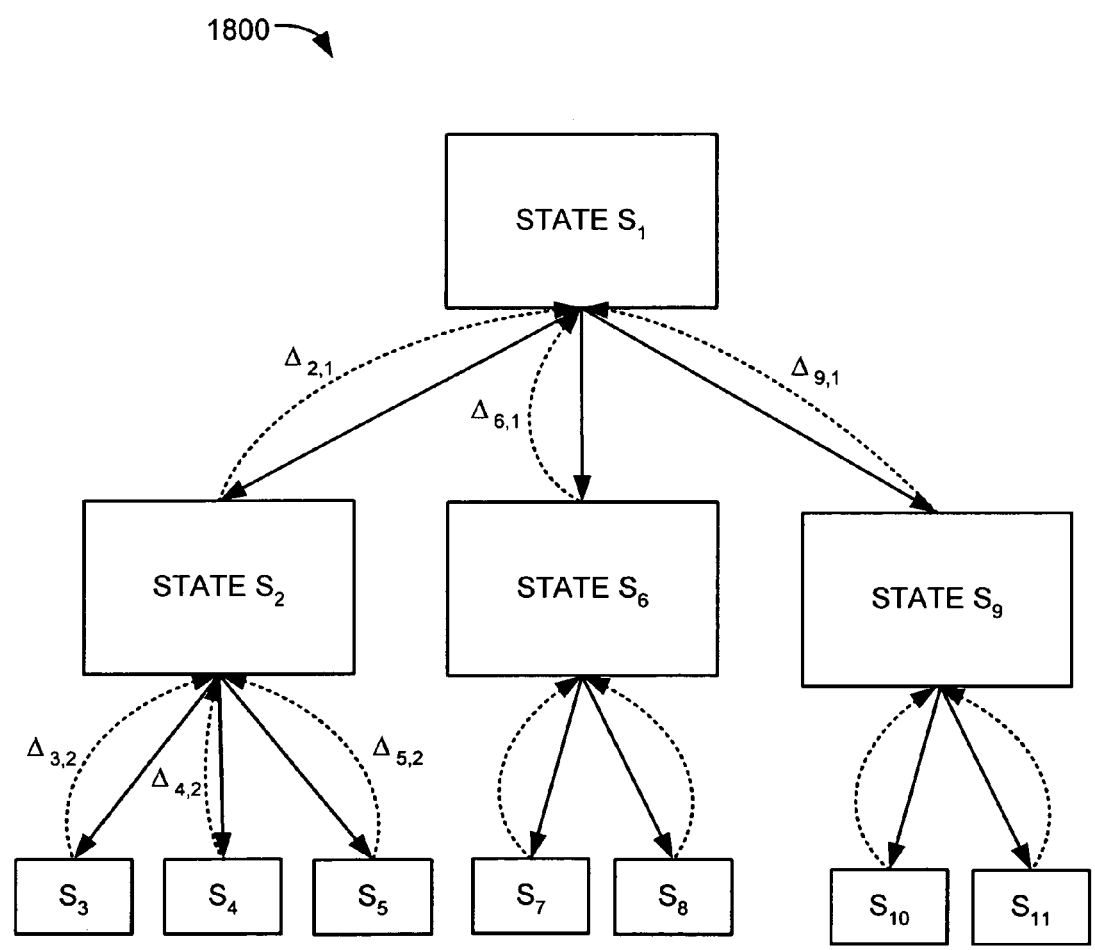
FIG. 18 is a block diagram showing an exemplary state tree.

Reverse state deltas can be used as a reversible log of operations taking place during state transitions for state space exploration. FIG. 18 shows an exemplary state tree 1800 with states $S_1$ through $S_{11}$. Such a tree 1800 can be explored in a depth-first search technique (e.g., starting with state $S_1$ and proceeding to state $S_2$, state $S_3$, state $S_4$, and so forth). Rather than storing a full representation of the state before proceeding to the next state, a reverse state delta can be stored. The reverse state delta functions as a reversible (e.g., undo) log of operations taking place during state transitions. The current state can be a complete copy of the state, but it is very efficient to backtrack to a previous state.

For example, after having explored state $S_3$, it may be desirable to generate state $S_4$ (e.g., via modeled logic of the software to be tested as applied to state $S_2$). The reverse state delta can be used to efficiently regenerate state $S_2$ (via the current state $S_3$ and the reverse state delta storing differences between $S_2$ and $S_3$). Then, modeled logic can be used to generate state $S_4$.

As shown in the drawing, a first state, state $S_1$, can transition to one of three states: state $S_2$, state $S_6$, or state $S_9$. Transitions have associated with them a reverse state delta that tracks the differences between states and enables efficient recovery of a prior state.

EXAMPLE 34

Exemplary Method for Exploring a State Tree

Figure 19:
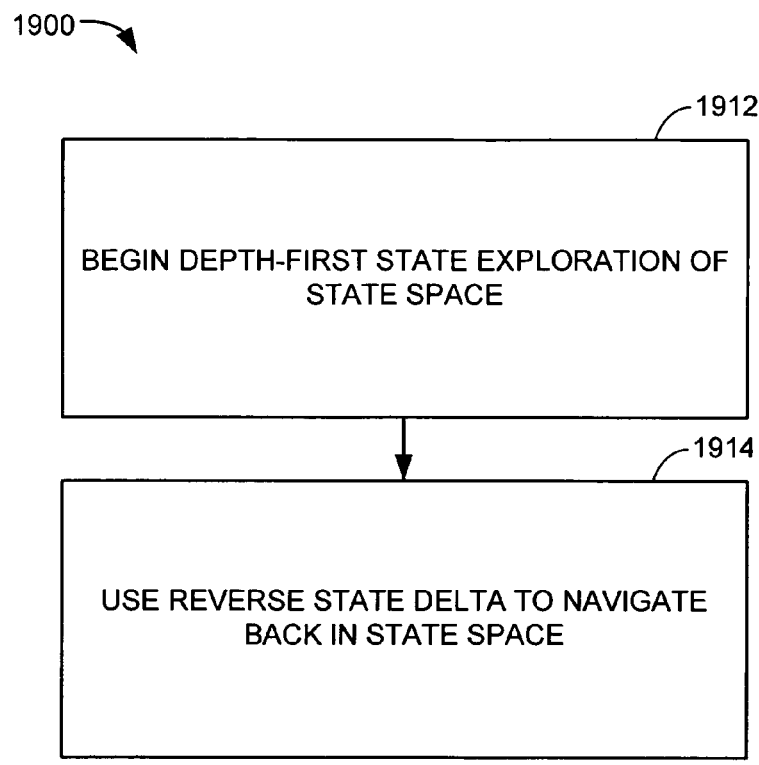
FIG. 19 is a flowchart showing an exemplary method for exploring a state tree, such as the exemplary state tree of FIG. 18.

FIG. 19 shows an exemplary method for exploring a state tree, such as the exemplary state tree of FIG. 18.

At 1912, a depth-first state exploration of the state space of an object-based software model is begun (e.g., at a root state).

At 1914, a reverse delta is used to navigate back (e.g., toward the root state) in the state space.

EXAMPLE 35

Exemplary State Delta Technique

An exemplary State Delta Module (SDM) can implement a reverse state delta technique as a component of the SSSE architecture. Alternatively, the SDM is operable independently of the SSSE framework. The SDM "checks in" the current state at branch points or whenever the runtime determines that a certain state needs to be recoverable, and maintains deltas in the form of undo logs between check-ins.

The state delta scheme assumes that a state may need to be recovered before the state information is destroyed or updated by further transitions. This allows the SDM to record differences only between checkpoints, and therefore save redundant undo information for repeated updates during a single transition. The SDM also can intercept destructive updates to the modeled state (e.g., stack push/pop operations and variable assignments). This can be accomplished by the SSSE compiler at compile time.

Deltas can be computed for each type of memory region in a SSSE state as follows: Stack frames in a SSSE state are a linked list of objects of type ZingMethod. Each stack frame may be viewed as a record of local variables (e.g., locals) and an uplink (e.g., caller).

The following is a pseudo code for stack frames in the example:

```
type stack_frame = {
    local_vars : local_vars;
    caller : stack_frame;
}
val stacks : stack_frame array
```

Two bits, dirty and pushed, are added to the current stack frames representation for computing stack deltas:

```
type stack_frame' = {
    dirty : boolean;
    pushed : boolean;
    frame : stack_frame;
}
val stacks : stack_frame' array
```

State deltas are represented as follows:

```
type stack_delta = delta_entry list
    and delta_entry = {
        version_number : int;
        undo_action : undo_action;
    }
and version_number = int
and undo_action =
        POP
      | PUSH of stack_frame
      | RESTORE of stack_frame
val stack_deltas : stack_delta array
```

Stack deltas are an array of per process stack deltas (stack_delta), each of which contains a list of (version_number, undo_action) pairs. With version_numbers, a specifc point in the past can be pinpointed and the undo information can be used to roll back to that point. undo_action records what needs to be done in order to go back to a previous checkpoint.

In the example, the space granularity is stack frames (e.g., common transactions are expected to only touch a small number of stack frames at a time). A dirty bit is assigned to each stack frame to record whether the contents of the current stack frame are changed during a state transition. A pushed bit is used to record whether the stack frame is newly pushed after the checkpoint. The result is the new stack_frame type defined above. Two aliases, top_of_stack and undo_log, are used to point to the stack and the undo log of the current process:

```
val top_of_stack : stack_frame'
val undo_log : delta_entry list
val curr_ver : int
```

Based on operations in each state transition, the per process stack delta is updated as follows:

1. If an assignment (x<- . . . ;) is encountered and the old dirty bit is not set, the old stack frame is saved in the undo log (L1), the dirty bit for the top-most stack frame (L2) is set, and the destructive update is done in place (L3):

```
    if (top_of_stack.dirty = false) {
L1:     undo_log <-
            let delta = {
                version_number = curr_ver;
                undo_action = RESTORE(clone(top_of_stack));
```

-continued

```
            } in
            undo_log <- delta::undo_log;
L2:     top_of_stack.dirty <- true;
        }
L3: top_of_stack.frame.local_vars.x <- ...;
```

If the dirty bit is set, L1 and L2 are skipped and only the update operation (L3) is carried out.

2. If a function call corresponds to a PUSH operation on the stack, the undo log for the PUSH operation (push sf, where sf is the new stack-frame) is updated as follows: 1) the undo action POP is inserted into the undo log (L1); 2) dirty and pushed bits are set to true; and 3) the stack frame is pushed onto the top of the stack (L4-L5):

```
L1:  undo_log <-
            let delta = {
                version_number = curr_ver;
                undo_action = POP;
            } in
            undo_log <- delta::undo_log;
L2:  sf.dirty <- true;
L3:  sf.pushed <- true;
L4:  sf.caller <- top_of_stack;
L5:  top_of_stack <- sf;
```

3. If a return from a function corresponds to a POP operation on the stack, three cases are distinguished based on the values of the flag bits (dirty and pushed) as follows:

If the pushed bit is set, the current stack frame is pushed after the last checkpoint, in which case the head of the undo log should be a POP record labeled with the current version number. The log is updated by removal of that POP entry.

If the dirty bit is set, but not pushed, there is updated information in the current stack frame during this transition, so the first entry in the undo log should be RESTORE (sf), which is removed and replaced with PUSH (sf).

If none of the bits are set, a copy is made of the current stack frame (sf<-clone(top_of_stack)), and the PUSH (sf) entry is inserted into the undo log.

At each checkpoint, the stack is walked through from the top by following the caller link, and the pushed and dirty bits of each stack frame encountered along the way are cleaned. The SDM stops when it either hits the bottom of the stack or encounters a "clean" stack frame. Also at each checkpoint, the current version number is incremented (e.g., curr_ver<-curr_ver+1).

To roll back to the checkpoint with version number n (post checkpoint), the SDM walks through the undo log and repeats the following two steps until either the undo log is empty or the version number of the head of the log is less than n.

1. Let the first element of the undo log be x, and assume x.version>=n. If x.undo_action is POP, the top stack frame is popped off the stack. If x.undo_action is PUSH (sf), sf is pushed onto the stack. If x.undo_action is RETORE (sf), the top stack frame is replaced by sf.

2. x is removed from the undo log.

In the example, the global variable region of a SSSE state can be viewed as a special stack with only one stack frame, and it is treated as such in the state delta scheme. Operations on globals are simplified because there are no push and pop operations. Therefore, only the dirty flag and RESTORE action, as described above, are needed.

Heap deltas are done on a per-object basis.

The heap in a SSSE state is a mapping from integers (pointers) to SSSE objects:

```
heap: int -> object
```

In order to record undo information, the heap is modified to be a mapping from integers (pointers) to stacks of (version number, dirty, object) triples:

```
heap: int -> { version: int; dirty : bool; obj: object; } stack
curr_ver : int
```

Updates to the heap entry i (heap[i]<-obj' in the old representation) will be mapped to the following operations:

```
top <- Stack.peek(heap[i]);
if (top.dirty == false) {
    top <- clone(top);
    top.version <- curr_ver;
    heap[i] <- Stack.push(heap[i], top);
    top.dirty <- true;
}
top.obj <- obj';
```

Checkpoints involve clearing all dirty bits and incrementing the current version number:

```
foreach (obj_stack in heap) {
    top <- Stack.peek(obj_stack);
    top.dirty <- false;
}
curr_ver++;
```

If the SDM wants to rollback to version n (post checkpoint), each stack in the heap is popped until the top entry of the stack has an earlier version number:

```
foreach (obj_stack in heap) {
    while (Stack.peek(obj_stack).version >= n) {
        obj_stack <- Stack.pop(obj_stack);
    }
}
```

EXAMPLE 36

Exemplary Atomic Transactions for Reduction Techniques

Figure 20:
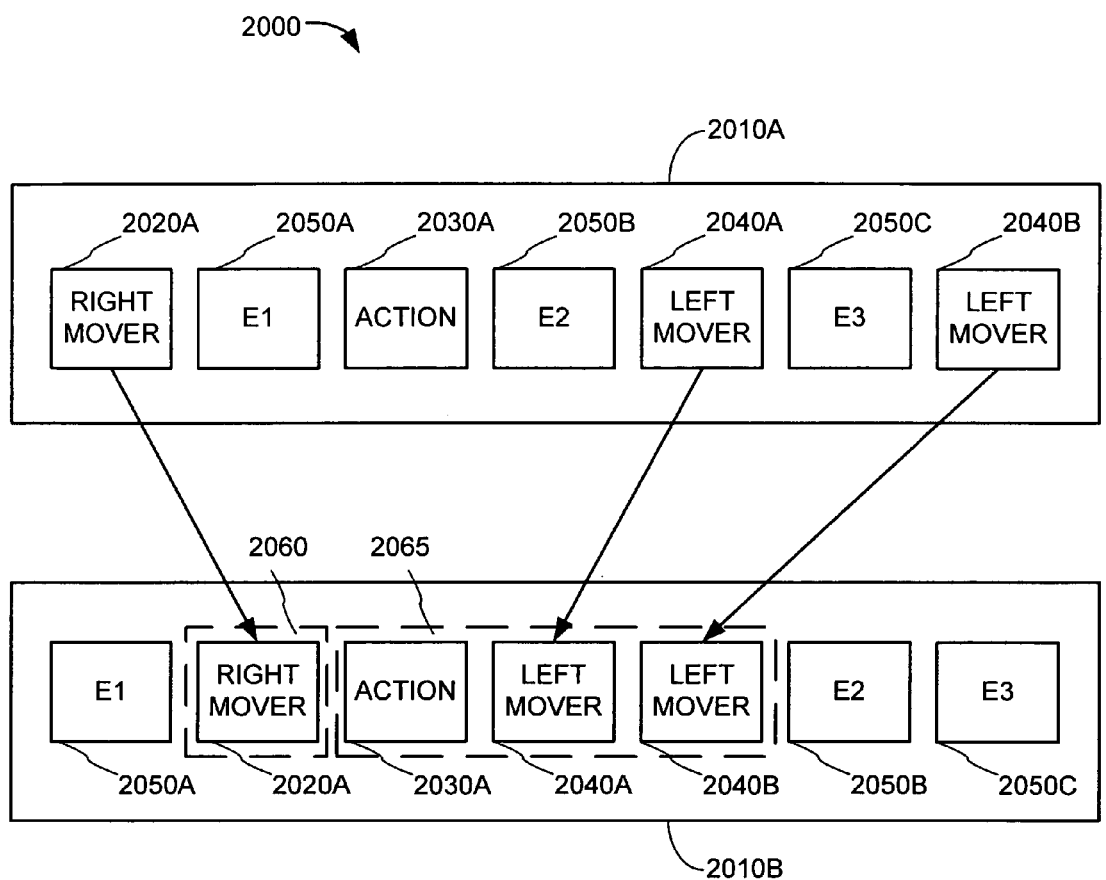
FIG. 20 is a block diagram showing an exemplary arrangement illustrating a reduction phenomenon.

FIG. 20 shows an exemplary arrangement 2000 involving right and left movers. Right movers are actions that can be commuted to the right (e.g., moved later in time) of any action of another thread without affecting the resulting state. Thus, during modeling, the right mover can be modeled as occurring after any action of another thread. Conversely, left movers are actions that can be commuted to the left (e.g., moved earlier in time) of any action of another thread without affecting the resulting state. Thus, during modeling, the left mover can be modeled as occurring before any action of another thread.

In the example, a set of actions 2010A for a plurality of threads is shown. A first thread executes the actions right mover 2020A, action 2030A, left mover 2040A, and left mover 2040B. One or more other threads execute the actions $E_1$ 2050A, $E_2$ 2050B, and $E_3$ 2050C. In the example, the right mover action 2020A has been identified (e.g., by software) as a right mover, and the left mover actions 2040A and 2040B have been identified (e.g., by software) as left movers.

Based on applying the technique of right and left movers, when the actions are modeled, the right mover 2020A can be moved to the right of any action of any other thread until it abuts the action 2030A. Conversely, the left mover actions 2040A and 2040B can be moved to the left of any action of any other thread until they abut the action 2030A. As a result, the multithreaded execution of the actions shown in 2010A can be modeled as the actions shown in 2010B while still accurately modeling the resulting state of the software when executed in a multithreaded scenario. Accordingly, the actions 2020A, 2030A, 2040A, and 2040B are atomically modelable with respect to multithreaded execution of the software.

The set of actions 2020A, 2030A, 2040A, and 2040B is thus sometimes said to be a "transaction." The pre-commit stage 2060 in the example includes only the right mover 2020A. The post-commit stage 2065 includes the action 2030A and the left movers 2040A and 2040B. When modeling software, execution of logic modeling the set of actions can be executed without regard to interleaving execution by other threads. As a result, states relating to such interleaved execution need not be explored. In this way, the size of the state space to be explored can be dramatically reduced in many cases.

EXAMPLE 37

Exemplary Method for Applying Reduction Techniques

Figure 21:
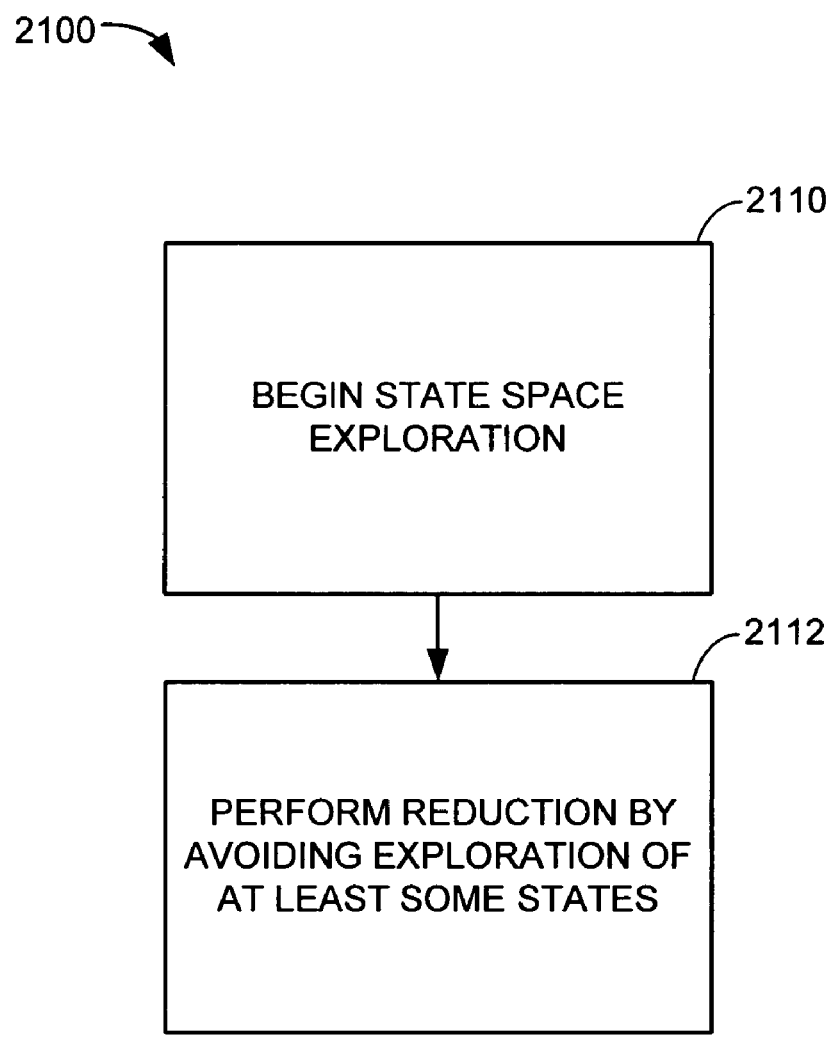
FIG. 21 is a flowchart showing an exemplary method for employing reduction.

FIG. 21 shows an exemplary method 2100 for applying reduction techniques to reduce the number of states to be explored.

At 2110, state exploration is begun. For example, a depth-first search of the state space can begin.

At 2112, at least some states are avoided via application of reduction techniques. For example, actions such as the set of actions 2020A, 2030A, 2040A, and 2040B shown in FIG. 20 can be executed without considering possible interleavings by other processes.

Reduction can be used to guide state delta processing. For example, check-ins can be done when a first non-right mover (e.g., action 2030A) is encountered, and then after subsequent left movers (e.g., 2040A, and 2040B), until a right mover is detected. Check-ins need not be performed during right mover processing. To facilitate such an approach, a variable can track the phase of the transaction (e.g., 0=pre-commit, 1=post-commit). Alternatively, check-ins can correspond to transaction boundaries.

In this way, the number of states to be explored can be dramatically reduced.

EXAMPLE 38

Exemplary State Change Interceptors

To intercept the changes in state, a variety of techniques can be used. For example, in a representation of shared states, accesses to global variables can be trapped with accessor properties. Specifically, the "globals" struct can become a class with a dirty bit, and fields in the structs can be replaced by private data fields and public accessors that are open to instrumentation by modifying the "get" and "set" method in the accessor when modeling the software to be tested.

EXAMPLE 39

Exemplary Abstraction for Locks

Abstraction can include simplifying software to be tested to such an extent that only the relevant state is retained. For example, when a check is made to see if an acquired lock is eventually released, an abstraction can be constructed that involves just the software's control flow graph and one bit of information as to whether the lock is held or not. This abstraction can have a state space linear in the size of the software, and hence can be used to check for proper lock usage on very large software.

EXAMPLE 40

Exemplary Objects

The objects used in the object-based software model can be constructed according to any of a variety of programming object models (e.g., COM+, NET, CORBA, and the like) by which objects can be instantiated from object classes.

Although classes are typically defined by a programmer, some of the techniques described herein can include classes defined by software. The class definition can include a specification of the data members (e.g., properties) and methods (or "member methods") (e.g., member functions) of instances of the class.

Typically, the class of an object is uniquely identified by a class identifiers (e.g., CLSID). After instantiation (e.g., creation of an instance data structure via a class factory), the object can receive method calls to access its internal logic and data members. A set of member functions can be exposed via an interface to the object. By convention, the interfaces of an object are illustrated graphically as a plug-in jack.

The objects can exhibit the characteristics of polymorphism, inheritance, and encapsulation.

EXAMPLE 41

Exemplary Concurrency Error Discovery

During use of a tool using the technologies described herein, a concurrency error was discovered in a BLUE-TOOTH driver for the MICROSOFT WINDOWS operating system. This driver handles races between a routine called "PNP Stop" and other dispatch routines.

Figure 22:
FIG. 22 is a screen shot showing an exemplary user interface for a systematic state space explorer.

The driver code should satisfy the invariant that during the execution of a dispatch routine doing work, the PNP Stop routine should not be allowed to stop the device. During testing, it was discovered that this invariant is violated in one particular interleaving of events between the dispatch thread and the PNP Stop routine. An SSSE was able to automatically generate an "error trace" (e.g., an interleaving leading to the error, as illustrated in FIG. 22). The SSSE was able to validate the proposed fix and prove systematically that the error does not happen in any interleaving between the PNP Stop and dispatch routines. The driver code and the error are described in more detail in the following paragraphs.

The interaction between the pieces of software can be complicated. If a dispatch routine is doing useful work, and the I/O Manager sends a PNP Stop IRP, then the PNP Stop is made to wait until the dispatch routine finishes, and then the device is stopped. During the time that PNP Stop waits, if other IRPs are sent, they are all aborted with a failed status. The synchronization between the threads is quite complex. It is implemented using three objects: a boolean flag called driverStoppingFlag in the device extension, an event called stoppingEvent, and a reference count field pendingIo in the device extension. The details of the synchronization are as follows:

```
static void BCSP_Miniport_PnpStop (DEVICE_OBJECT BtDevice)
{
  DEVICE_EXTENSION deviceExtension =
  BtDevice.deviceExtension;
  deviceExtension.driverStoppingFlag = true;
  BCSP_IoDecrement(deviceExtension);
  KeWaitForStoppingEvent(deviceExtension);
  deviceExtension.stopped = true;
}
static void BCSP_Miniport_Read (DEVICE_OBJECT BtDevice)
{
  DEVICE_EXTENSION deviceExtension = BtDevice.deviceExtension;
  int status;
  status = BCSP_IoIncrement (deviceExtension);
  if(status > 0)
  {
    // do work here
    assert(!deviceExtension.stopped);
  }
  BCSP_IoDecrement(deviceExtension);
}
static int BCSP_IoIncrement(DEVICE_EXTENSION e)
{
  int status;
  bool driverStopping = e.driverStoppingFlag;
  if(driverStopping == true)
    status = -1;
  else
  {
    InterlockedIncrementPendingIo(e);
    status = 1;
  }
  return(status);
}
static void BCSP_IoDecrement(DEVICE_EXTENSION e)
{
  int pendingIo;
  pendingIo = InterlockedDecrementPendingIo(e);
  if(pendingIo == 0)
    KeSetEventStoppingEvent(e);
}
```

In the example, the reference count pendingIo is initialized to 1, and the stoppingFlag is set to false during driver entry. Every dispatch routine does the following:

1. Check the driverStoppingFlag to see if the PNP Stop has already arrived.
2. If driverStoppingFlag is true, then fail the IRP.

If driverStoppingFlag is false, then the reference count pendingIo is incremented, whatever work needs to be done is done, and then the reference count is decremented. After decrementation of the reference count, if the reference count reaches 0, then the stoppingEvent is signaled.

The PNP Stop routine does the following:
1. Set the driverStoppingFlag to true.
2. Decrement the reference count pendingIo. After decrementing the reference count, if the reference count reaches 0, then signal the stoppingEvent.
3. Wait for the stoppingEvent.
4. Stop the device.

An invariant the driver code has is that while a dispatch routine is doing work, the PNP Stop routine is not allowed to stop the device. It turns out that this invariant is violated in one particular interleaving of events between the dispatch thread and the PNP Stop routine. Suppose the dispatch thread has just finished checking the driverStoppingFlag and ascertained that it is false. At this point, the dispatch routine has concluded that it can safely proceed, although it has not yet incremented the reference count. If at this precise moment the PNP Stop IRP is fired, it will set the driverStoppingFlag to true, decrement the reference count to zero, and stop the device. In this particular interleaving, the dispatch thread continues execution after incrementing the reference count, unaware that the device has been already stopped. The SSSE can automatically produce this exact interleaving from just the SSSE model for the driver. The SSSE browser as illustrated in FIG. 22 shows this error trace, allowing the user to step through all the events that led to the assertion violation.

The developer proposed this problem be fixed by changing the dispatch routine to first increment the reference count and then check the driverStoppingFlag (and decrement the reference count back if the flag is set). The SSSE was able to validate the fix by proving that the desired invariant holds in all possible interleavings between the dispatch routine and the PNP Stop IRP.

Thus, the SSSE was used to find an error and validate that the fix worked.

EXAMPLE 42

Exemplary Process

Although the examples herein show processes, threads can be used in their place, or a combination of threads and processes can be used. For example, wherever a modeled process is shown, a thread can be modeled. Both threads and processes can be modeled via a model properly defining them.

EXAMPLE 43

Exemplary Computing Environment

Figure 23:
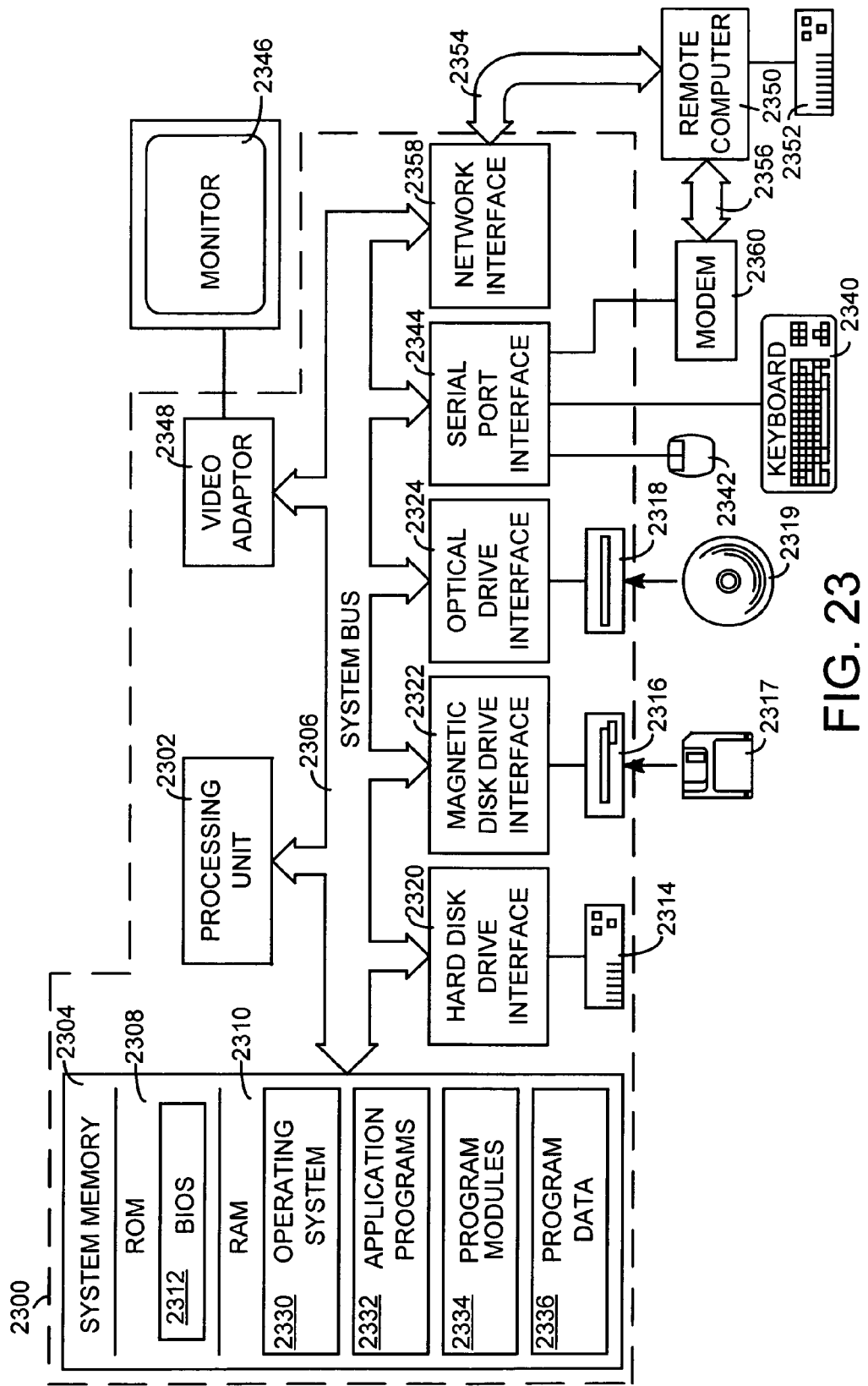
FIG. 23 is a diagram depicting a general-purpose computing device constituting an exemplary system for implementing the disclosed technology.

FIG. 23 and the following discussion are intended to provide a brief, general description of an exemplary computing environment in which the disclosed technology may be implemented. Although not required, the disclosed technology will be described in the general context of computer-executable instructions, such as program modules, being executed by a personal computer (PC). Generally, program modules include routines, programs, objects, components, data structures, etc. that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 23, an exemplary system for implementing the disclosed technology includes a general purpose computing device in the form of a conventional PC 2300, including a processing unit 2302, a system memory 2304, and a system bus 2306 that couples various system components including the system memory 2304 to the processing unit 2302. The system bus 2306 may be any of several types of bus structures including a memory bus or memory controller, a peripheral bus, and a local bus using any of a variety of bus architectures. The system memory 2304 includes read only memory (ROM) 2308 and random access memory (RAM) 2310. A basic input/output system (BIOS) 2312, containing the basic routines that help with the transfer of information between elements within the PC 2300, is stored in ROM 2308.

The PC 2300 further includes a hard disk drive 2314 for reading from and writing to a hard disk (not shown), a magnetic disk drive 2316 for reading from or writing to a removable magnetic disk 2317, and an optical disk drive 2318 for reading from or writing to a removable optical disk 2319 (such as a CD-ROM or other optical media). The hard disk drive 2314, magnetic disk drive 2316, and optical disk drive 2318 are connected to the system bus 2306 by a hard disk drive interface 2320, a magnetic disk drive interface 2322, and an optical drive interface 2324, respectively. The drives and their associated computer-readable media provide non-volatile storage of computer-readable instructions, data structures, program modules, and other data for the PC 2300. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk, magnetic disk 2317, optical disk 2319, ROM 2308, or RAM 2310, including an operating system 2330, one or more application programs 2332, other program modules 2334, and program data 2336. A user may enter commands and information into the PC 2300 through input devices such as a keyboard 2340 and pointing device 2342 (such as a mouse). Other input devices (not shown) may include a digital camera, microphone, joystick, game pad, satellite dish, scanner, or the like. These and other input devices are often connected to the processing unit 2302 through a serial port interface 2344 that is coupled to the system bus 2306, but may be connected by other interfaces such as a parallel port, game port, or universal serial bus (USB). A monitor 2346 or other type of display device is also connected to the system bus 2306 via an interface, such as a video adapter 2348. Other peripheral output devices, such as speakers and printers (not shown), may be included.

The PC 2300 may operate in a networked environment using logical connections to one or more remote computers, such as a remote computer 2350. The remote computer 2350 may be another PC, a server, a router, a network PC, or a peer device or other common network node, and typically includes many or all of the elements described above relative to the PC 2300, although only a memory storage device 2352 has been illustrated in FIG. 23. The logical connections depicted in FIG. 23 include a local area network (LAN) 2354 and a wide area network (WAN) 2356. Such networking environments are commonplace in offices, enterprise-wide computer networks, intranets, and the Internet.

When used in a LAN networking environment, the PC 2300 is connected to the LAN 2354 through a network interface 2358. When used in a WAN networking environment, the PC 2300 typically includes a modem 2360 or other means for establishing communications over the WAN 2356, such as the Internet. The modem 2360, which may be internal or external, is connected to the system bus 2306 via the serial port interface 2344. In a networked environment, program modules depicted relative to the personal computer 2300, or portions thereof, may be stored in the remote memory storage device. The network connections shown are exemplary, and other means of establishing a communications link between the computers may be used.

ALTERNATIVES

The technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. Rather, the scope of the invention includes what is covered by the following claims. We therefore claim as our invention all that comes within the scope and spirit of these claims.

We claim:

1. A computer-implemented method of storing one or more representations of states of software, the software having logic and being configured to execute using a plurality of processes, the method comprising:

storing a model of the software in one or more objects, wherein the model comprises modeled logic modeling at least a subset of the logic of the software, the model comprises a current state of the software model modeling a possible state of the software, and the one or more objects are instantiated from one or more object classes, wherein the one or more objects comprise a state object configured to describe a number of active processes for the current state of the software model among the plurality of processes and a most recently explored process of the plurality of processes, wherein the state object is configured to indicate whether a selected process of the plurality of processes is blocked in the current state of the software model, and wherein the state object is configured to execute the selected process in the current state of the software model for one atomic step and to provide an indication of a new state;

storing a representation of a difference between a previous state of the software model and the current state of the software model rather than storing both the previous state of the software model and the current state of the software model, allowing the previous state of the software model to be recovered without having to keep a complete copy of the previous state of the software model;

receiving, in at least one of the objects, a method call initiating a software modeling function; and responsive to receiving the method call, initiating the software modeling function.

2. The method of claim 1 wherein the modeling function comprises initiating controlled execution of one out of a plurality of modeled threads.

3. The method of claim 1 wherein the modeling function comprises initiating controlled execution of the modeled logic along one of a plurality of possible execution paths.

4. The method of claim 1 wherein the modeling function comprises taking action to subsequently provide the current state of the modeled software.

5. The method of claim 1 further comprising saving undo information for first destructive updates to the current state.

6. The method of claim 1 wherein the modeling function comprises reporting whether a modeled process is unblocked.

7. The method of claim 1 wherein the modeling function comprises controlled execution of the modeled logic, the method further comprising:
during controlled execution of the modeled logic initiated via the method call, modifying the current state of the software according to the modeled logic, resulting in a modified state.

8. The method of claim 7 further comprising:
storing a representation of a difference between the modified state and the current state; and
reproducing the current state via the modified state and the representation of the difference.

9. The method of claim 7 wherein controlled execution of the modeled logic software supports a primitive statement for creating an object of an object class.

10. The method of claim 7 wherein controlled execution of the modeled logic software supports a primitive statement for throwing an exception.

11. The method of claim 7 wherein controlled execution of the modeled logic supports a heap.

12. The method of claim 7 wherein controlled execution of the modeled logic supports a plurality of modeled processes.

13. The method of claim 7 wherein controlled execution of the modeled logic software supports primitives operating on arrays, sets, and channels.

14. The method of claim 7 wherein controlled execution of the modeled logic software supports a plurality of nondeterministic choices in an execution path.

15. The method of claim 12 wherein controlled execution of the modeled logic supports separate stacks for the modeled processes.

16. One or more computer-readable storage media having computer-executable instructions for performing a method, wherein the method comprises: storing a in one or more objects a model of software, the software having logic and being configured to execute using a plurality of processes, wherein the model comprises modeled logic modeling at least a subset of the logic of the software, the model comprises a current state of the software model modeling a possible state of the software, and the one or more objects are instantiated from one or more object classes, wherein the one or more objects comprise a state object configured to describe a number of active processes for the current state of the software model among the plurality of processes and a most recently explored process of the plurality of processes, wherein the state object is configured to indicate whether a selected process of the plurality of processes is blocked in the current state of the software model, and wherein the state object is configured to execute the selected process in the current state of the software model for one atomic step and to provide an indication of a new state;
storing a representation of a difference between a previous state of the software model and the current state of the software model rather than storing both the previous state of the software model and the current state of the software model, allowing the previous state of the software model to be recovered without having to keep a complete copy of the previous state of the software model;
receiving, in at least one of the objects, a method call initiating a software modeling function; and
responsive to receiving the method call, initiating the software modeling function.

17. One or more computer-readable storage media having computer-executable instructions tested via a method of testing software, the software having to logic and being configured to execute using a plurality of processes, wherein the method comprises:
storing a model of the software in one or more objects, wherein the model comprises modeled logic modeling at least a subset of the logic of the software, the model comprises a current state of the software model modeling a possible state of the software, and the one or more objects are instantiated from one or more object classes, wherein the one or more objects comprise a state object configured to describe a number of active processes for the current state of the software model among the plurality of processes and a most recently explored process of the plurality of processes, wherein the state object is configured to indicate whether a selected process of the plurality of processes is blocked in the current state of the software model, and wherein the state object is configured to execute the selected process in the current state of the software model for one atomic step and to provide an indication of a new state;
storing a representation of a difference between a previous state of the software model and the current state of the software model rather than storing both the previous state of the software model and the current state of the software model, allowing the previous state of the software model to be recovered without having to keep a complete copy of the previous state of the software model;
receiving, in at least one of the objects, a method call initiating a software modeling function; and
responsive to receiving the method call, initiating the software modeling function.

18. A system configured to perform software state exploration, the system comprising:
a processing unit;
one or more computer-readable storage media storing:
instructions executable by the processing unit for a systematic state explorer operable to direct systematic state exploration of modeled software;
an object class definition defining an object operable to receive directives from the systematic state explorer, wherein the directives comprise method calls on the object to initiate modeling functions on the modeled software, and the object is operable to provide a current state of the modeled software;
an object class definition defining a state object operable to describe a number of active processes for the current state of the software model among the plurality of processes and a most recently explored process among the plurality of processes, to indicate whether a selected process among the plurality of processes is blocked in the current state of the software model, and to execute the selected process in the current state of the software model for one atomic step and to provide an indication of a new state; and
a stored representation of a difference between a previous state of the modeled software and the current state of the modeled software, wherein the stored representation comprises a variable and a dirty indicator for the variable, the dirty indicator indicating whether the variable has changed since the previous state of the modeled software.

19. The system of claim 18 wherein the directives comprise a directive for initiating controlled execution of a specified one out of a plurality of processes of the modeled software.

20. The system of claim 18, wherein the systematic state explorer uses a state vector having a non-fixed size.

21. A computer-implemented method of processing a plurality of recoverable states of modeled software during testing of the modeled software, the method comprising:
storing a model of the modeled software in one or more objects, wherein the one or more objects comprise a state object configured to describe a number of active processes for a current state of the software model among the plurality of processes and a most recently explored process of the plurality of processes, wherein the state object is configured to indicate whether a selected process of the plurality of processes is blocked in the current state of the software model, and wherein the state object is configured to execute the selected process in the current state of the software model for one atomic step and to provide an indication of a new state;
storing a base state for the modeled software, wherein the base state comprises a variable and a dirty indicator for the variable, the dirty indicator indicating whether the variable has changed since an other state of the software during testing of the modeled software; and
storing the other state as a difference between the base state and the other state, the stored difference comprising a previous value of the variable, a list of restore information at a level of granularity corresponding to an object to be restored, and a copy of a modeled object modified during modeled execution of the modeled software without comprising a copy of other objects not modified during modeled execution of the modeled software, wherein the object comprises a method call.

22. The method of claim 21 wherein the difference comprises a copy of modeled global variables modified during modeled execution of the modeled software.

23. The method of claim 21 wherein the difference comprises a copy of a modeled stack frame modified during modeled execution of the modeled software without comprising a copy of other modeled stack frames not modified during modeled execution of the modeled software.

24. The method of claim 21 wherein the difference further comprises a list of restore information at a level of granularity corresponding to a stack frame to be restored.

25. The method of claim 21 further comprising:
receiving an indication of a first state check-in;
receiving an indication of a second state check-in; and
storing state differences between the first state check-in and the second-state check-in as the difference between the base state and the other state.

26. The method of claim 21 wherein the base state is a state following the other state during testing of the modeled software.

27. The method of claim 21 wherein the difference comprises a reverse state delta.

28. The method of claim 21 wherein:
the base state is a result of state modifications on the other state made during modeled program execution.

29. The method of claim 21 further comprising:
recovering the other state from the base state during traversal towards a root of a state space tree for the modeled software.

30. The method of claim 25 further comprising omitting to represent a pop of a stack frame that has been modified between the first state check-in and the second state check-in.

31. The method of claim 25 wherein the first check-in and the second check-in are received responsive to detection of transaction boundaries within a set of instructions atomically modelable with respect to multithreaded execution of the instructions.

32. One or more computer-readable storage media having computer-executable instructions for performing a method of processing a plurality of recoverable states of modeled software during testing of the modeled software, wherein the method comprises:
storing a model of the modeled software in one or more objects, wherein the one or more objects comprise a state object configured to describe a number of active processes for the current state of the software model among a plurality of processes and a most recently explored process among the plurality of processes, wherein the state object is configured to indicate whether a selected process among the plurality of processes is blocked in the current state of the software model, and wherein the state object is configured to execute the selected process in the current state of the software model for one atomic step and to provide an indication of a new state;
storing a base state for the modeled software, wherein the base state comprises a variable and a dirty indicator for the variable, the dirty indicator indicating whether the variable has changed since an other state of the software during testing of the modeled software; and
storing the other state as a difference between the base state and the other state, the stored difference comprising a previous value of the variable, a list of restore information at a level of granularity corresponding to an object to be restored, and a copy of a modeled object modified during modeled execution of the modeled software without comprising a copy of other objects not modified during modeled execution of the modeled software, wherein the object comprises a method call.

33. One or more computer-readable storage media having computer-executable instructions for performing a method using a reduction technique on a model of software, wherein the method comprises:
storing in one or more objects the model of software, the software having logic and being configured to execute using a plurality of processes, wherein the model comprises modeled logic modeling at least a subset of the logic of the software, the model comprises a current state of the software model modeling a possible state of the software, and the one or more objects are instantiated from one or more object classes, wherein the one or more objects comprise a state object configured to describe a number of active processes for the current state of the software model among the plurality of processes and a most recently explored process among the plurality of processes, wherein the state object is configured to indicate whether a selected process among the plurality of processes is blocked in the current state of the software model, and wherein the state object is configured to execute the selected process in the current state of the software model for one atomic step and to provide an indication of a new state;
applying the reduction technique to the model of software, wherein the reduction technique comprises performing a check-in upon encountering a first non-right-mover action among a plurality of actions performed by the model of software;
storing a representation of a difference between a previous state of the software model and the current state of the software model rather than storing both the previous state of the software model and the current state of the software model, allowing the previous state of the software model to be recovered without having to keep a complete copy of the previous state of the software model, wherein one or more changes for one or more states of the software model occurring between the previous state of the software model and the current state of the software model are unrecorded;

receiving, in at least one of the objects, a method call initiating a software modeling function; and responsive to receiving the method call, initiating the software modeling function.

* * * * *